United States Patent [19]

Chisum

[11] Patent Number: 5,058,286
[45] Date of Patent: Oct. 22, 1991

[54] METHOD AND APPARATUS FOR REPAIRING AND STRAIGHTENING VEHICLE BODY AND FRAME MISALIGNMENT

[76] Inventor: Finis L. Chisum, Rte. 5, Box 267, Claremore, Okla. 74017

[21] Appl. No.: 431,471

[22] Filed: Nov. 1, 1989

[51] Int. Cl.⁵ .................... G01B 5/25; G01C 15/12
[52] U.S. Cl. ..................................... 33/608; 33/288
[58] Field of Search .............. 33/608, 288; 72/705, 72/457, 447

[56] References Cited

U.S. PATENT DOCUMENTS

| | | |
|---|---|---|
| Re. 31,636 | 7/1984 | Chisum . |
| 4,174,623 | 10/1979 | LeGrand et al. . |
| 4,242,803 | 1/1981 | Dory ............................ 33/608 X |
| 4,319,402 | 3/1982 | Martin . |
| 4,321,754 | 3/1982 | Colby . |
| 4,329,784 | 5/1982 | Bjork . |
| 4,442,608 | 4/1984 | Clausen . |
| 4,463,937 | 8/1984 | Celette . |
| 4,490,918 | 1/1985 | Clausen ............................ 33/288 |
| 4,534,200 | 8/1985 | Celette . |
| 4,557,127 | 1/1985 | Pietrelli . |
| 4,574,614 | 3/1986 | Field . |
| 4,586,359 | 5/1986 | Parks . |
| 4,603,570 | 8/1986 | Dehn . |
| 4,660,405 | 4/1987 | Widegren . |
| 4,731,936 | 3/1988 | Aldrich et al. ...................... 33/608 |
| 4,756,089 | 7/1988 | Danielsson ...................... 33/608 X |

FOREIGN PATENT DOCUMENTS

| | | |
|---|---|---|
| 2145992 | 3/1973 | Fed. Rep. of Germany . |
| 8707190 | 12/1987 | World Int. Prop. O. ............ 72/705 |

Primary Examiner—Harry N. Haroian
Attorney, Agent, or Firm—Head & Johnson

[57] ABSTRACT

A measuring platform system is utilized to measure the extent of damaged or misaligned vehicle frames or bodies to expedite the repair thereof. The platform becomes the measuring datum plane from which all measurements as to the pre and post repair locus of a particular reference point on the vehicle are taken as to height above the datum plane and distance from a longitudinal centerline of the datum plane. Means are provided as a part of the platform system to raise the vehicle and move same to a position where the longitudinal vertical plane through the centerline of the vehicle intersects the centerline of the datum plane. A computer can be used as a part of the system.

61 Claims, 21 Drawing Sheets

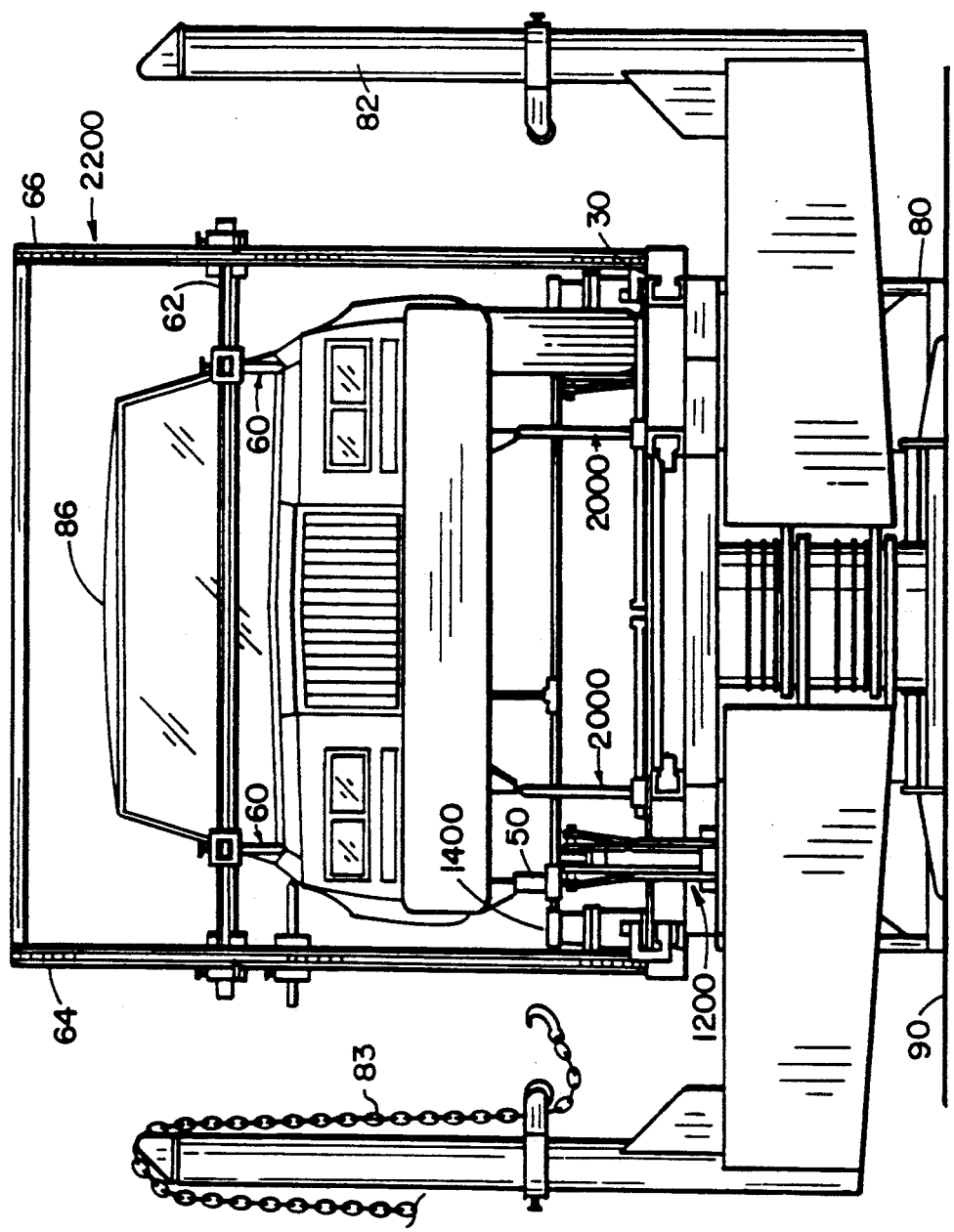

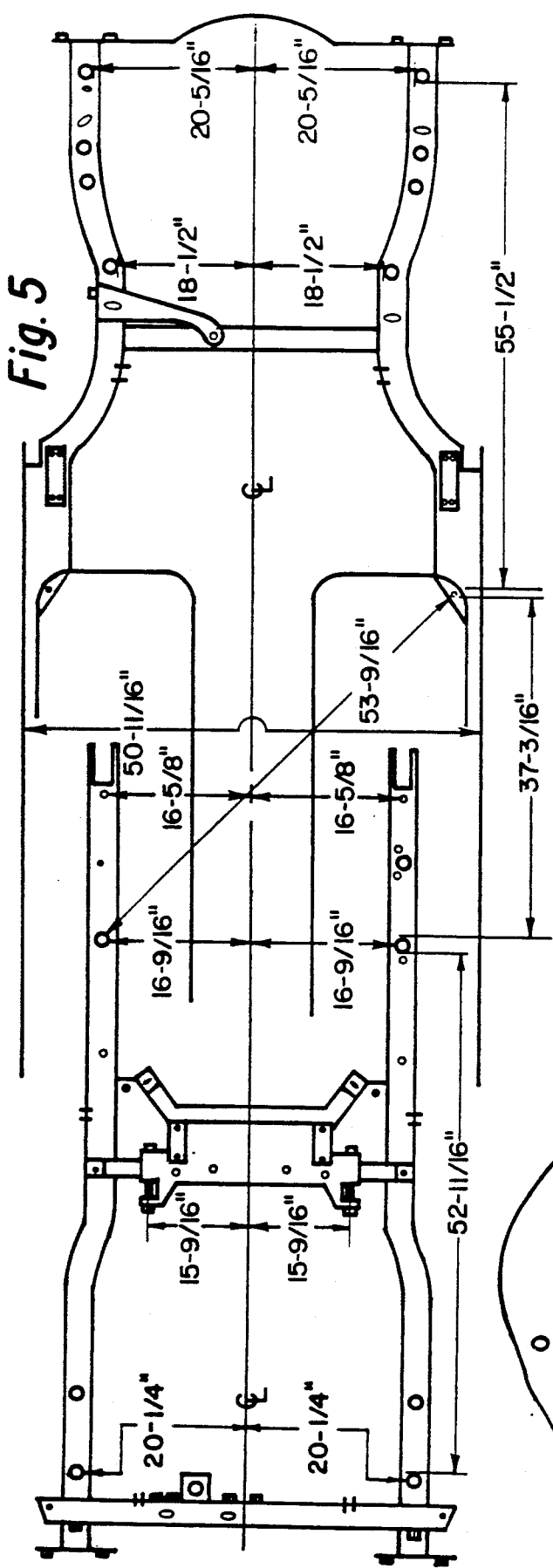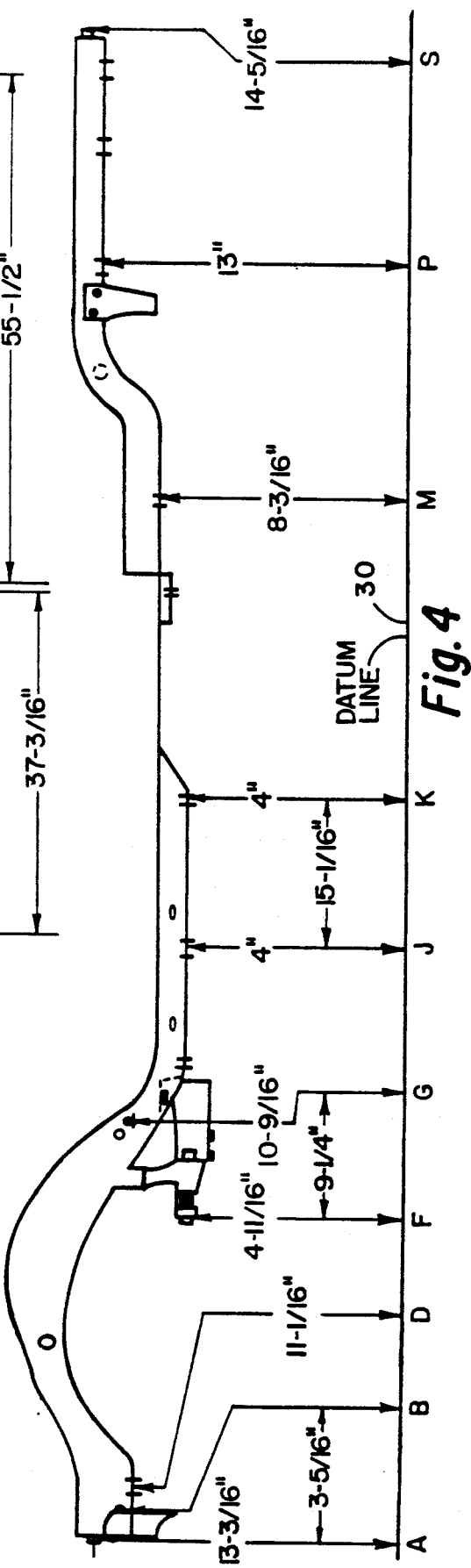

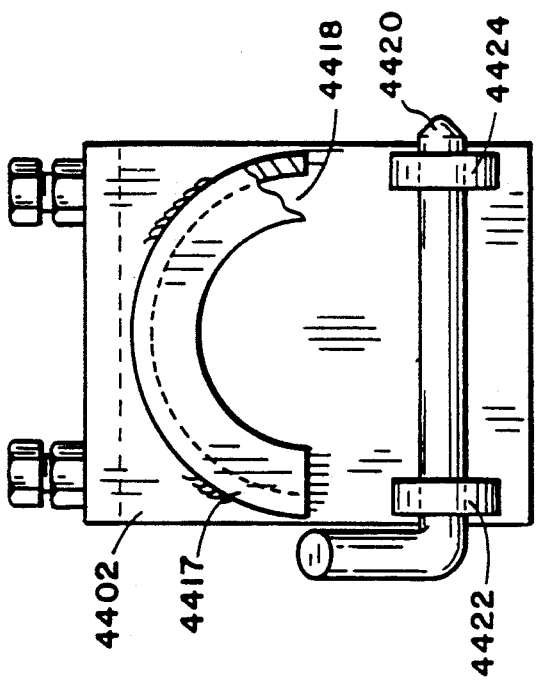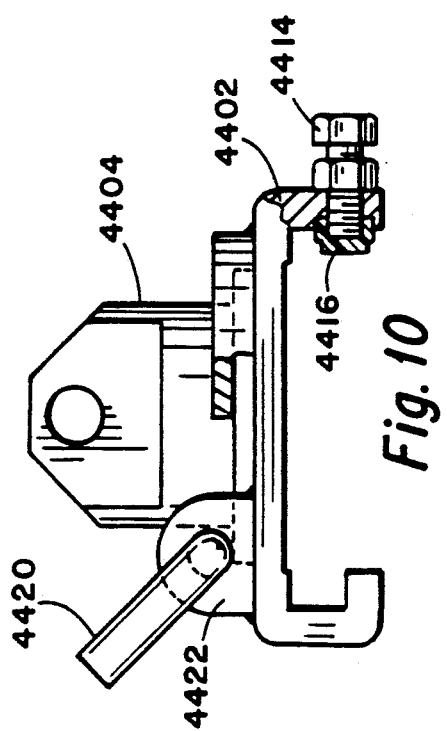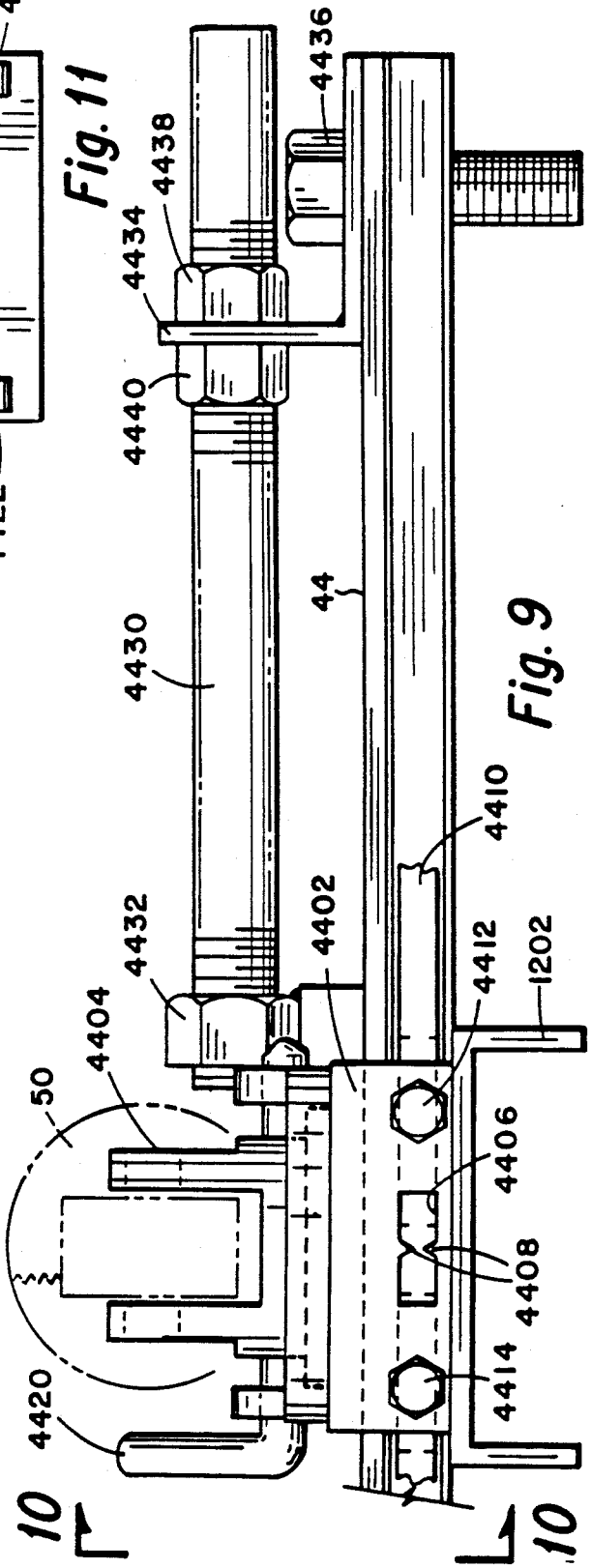

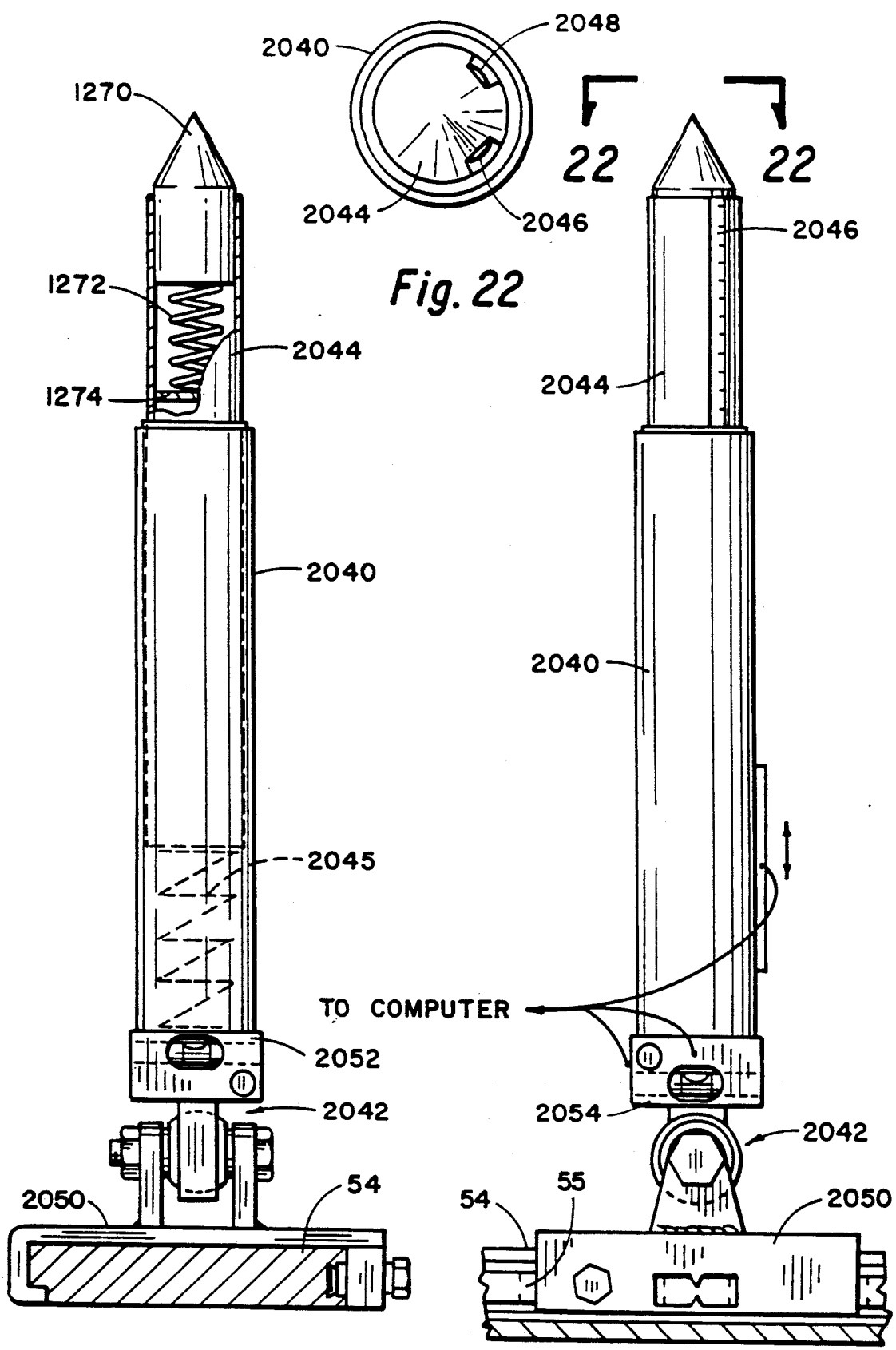

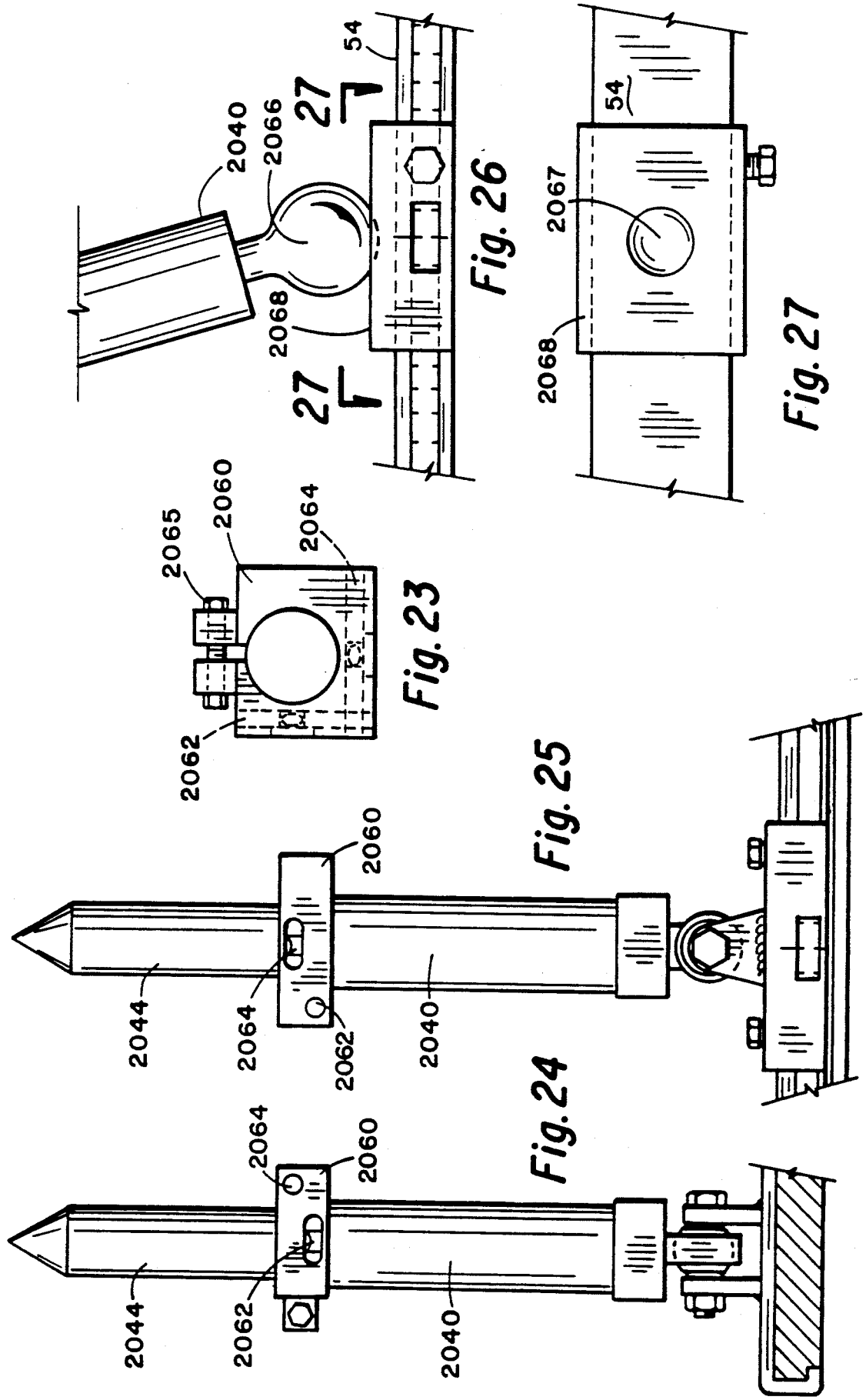

METHOD AND APPARATUS FOR REPAIRING AND STRAIGHTENING VEHICLE BODY AND FRAME MISALIGNMENT

BACKGROUND

The invention herein is directed to a measuring and gauging system for use in conjunction with a vehicle body and frame straightening apparatus. Specifically, the invention is directed to straightening and reforming vehicle bodies, frames, and other parts of damaged or misaligned vehicles back to their dimensions and specifications that have been precisely laid down by the vehicle manufacturer. These dimensions and specifications are provided by the manufacturer and others in the form of charts for each and every vehicle which indicate certain reference surfaces and locations for measurement purposes. When these measurements are in correct configuration, then the chassis is straight.

In recent years automotive vehicles have been constructed almost entirely of what has been called a "unitized" body. In such a construction the entire frame and body of the vehicle are a unit assembly. Such a construction has been found to be more economical, lighter weight, and can equal or exceed the strength of a conventional frame-type automobile used heretofore. The repair of a unitized vehicle body necessitates the use of frame straightening machines which are designed to pull the damaged vehicle frame into proper alignment. The manufacturer provides "fixturing holes" in the frame of the vehicles, which holes can be utilized for measurement and realignment when damage occurs.

For these purposes, a variety of methods and devices have been proposed to indicate or measure possible faulty or misaligned dimensions on the vehicle. To correct such misaligned vehicles such methods and apparatus as those disclosed in the Finis L. Chisum U.S. Pat. No. 360,066, issued Dec. 28, 1971 and U.S. Pat. No. RE 31,636, reissued July 1, 1984 from a patent issued June 10, 1975 are used. The aforesaid patents are incorporated herein by reference.

In the process of repairing collision damaged cars, in order that frame and/or body alignment repairs can be accomplished accurately and economically, it is necessary to have available for the technician performing the repairs the following equipment:

1. A jack of the lift system to raise the vehicle to a comfortable and efficient height to allow room (clearance) so the necessary equipment can be attached to the vehicle and allow workmen clearance underneath the car to perform the needed repairs.

2. A system to anchor the vehicle to a rigid device such as a platform system, bench system, or shop floor system to counteract the pulling and/or pushing forces necessary to carry out the repairs needed to return the vehicle to its pre-accident condition.

3. A measuring system, outer and upper, and under and inner, to aid in determining repairs needed to be done to a damaged vehicle and to show the technician when the critical points on the vehicle are back within acceptable tolerance.

4. A suitable platform system designed and built to accommodate a jack system, an anchoring system, a measuring system, and pulling and pushing system.

5. A suitable system for pulling and pushing the collision damaged vehicle back to its pre-accident condition.

Heretofore, all four of the above named systems have been completely separate, requiring that they be brought together to accomplish the necessary repairs to a collision damaged vehicle. In many cases this is with great difficulty because each device is designed to do a specific job such as lift the car, hold or anchor the car, measure or gauge the car, plus a system to pull or push. In nearly all cases, the room or space and clearance necessary for the technician to perform the repairs comfortably is sacrificed. Because of the time necessary to install and synchronize most measuring systems to the car, many technicians will simply not use the more sophisticated measuring systems, except in extreme cases, which means most medium damaged or light damaged cars are repaired the old-fashioned way, simply by eye-balling, tape measuring, and fitting body panels. As a result, many vehicles are coming out of body and frame shops unsatisfactorily repaired because of the measuring systems being too complicated, too delicate, and too time consuming to be economical to use.

Many of the so-called dedicated measuring systems concentrate on accuracy, which of course is required, but with very little or no consideration given to convenience or ease of operation to the technician nor to the time necessary for their use.

Technicians repairing collision damaged cars need all of the access to the damaged area they can possibly get. Many of the prior art measuring devices hinder the technician doing the repairs because they utilize or require all, or most of the space under the car, where access is crucial. This results in awkward or uncomfortable conditions for the operator or technician.

In the late 60's, innovative body and frame alignment equipment began to show up in the marketplace; namely, the apparatus and methods shown in the U.S. Pat. No. 3,630,066 and RE 31,636. By the end of the 70's this new approach to the body and frame alignment equipment with its multiple pulling system and utilized assemblies had proven its worth in the collision body shop operations in the U.S., Canada, and some foreign countries. Because of its ease of operation, vast capabilities, and because it was unitized, it was fully set up and ready to work at all times. A minimum of set-up time for each job was required, ease of operation, vast capabilities, speed of operation, and because it is unitized were the main reasons why this new equipment was so well received in the trade. Although this new equipment solved almost all of the age-old problems of returning a collision damaged vehicle to its pre-damaged condition and most of the back breaking labor connected with auto frame work, this new equipment did very little, if anything, to ease the problems of lifting the car, leveling the car, centering the car with the equipment, and gauging or measuring the damaged vehicle during the repair process.

Although in the last few years several jack or lift devices have been developed to raise the car for inspection or repairs and several anchoring and holding devices, along with many forms of gauging and measuring systems, all of these seem to address a specific individual problem such as lifting, holding, anchoring or measuring, and none of these devices are addressed to all of these problems at once.

SUMMARY OF THE INVENTION

A primary purpose of this invention is to allow an operator/mechanic/technician, reasonably skilled in the art of repairing collision damaged vehicles, a much faster, simpler, easier, and less complicated method of measuring and straightening frames and aligning bodies on collision damaged vehicles than is presently available in the art.

Another object of this invention is to provide a platform system combined with a vehicle lift system, a vehicle holding or anchoring system, and a means for centering the vehicle with the platform system, wherein the platform system becomes the basic reference datum point for a measuring system incorporated into the platform system.

As a result, the measuring system stays with the platform system and does not have to be disassembled and reconstructed between jobs, permitting construction of the measuring system from much heavier and stronger materials and thus provides much longer service life, and more accuracy without the danger of bumping, bending and knocking it out of alignment during its use.

A yet further object is to provide apparatus and methods which permit greater access to repair damage to the underside of the vehicle.

A further object of this invention is that the platform system, the lift system, the holding or anchoring system, the centering device, the measuring system, and the reconstruction apparatus is combined or unitized into one usable unit, yet is adjustable to fit, lift, hold or anchor and measure any automobile type vehicle or truck during the process of repairing collision damage that may have occurred to a vehicle involved in an accident. The concepts of the invention are applicable to heavy trucks and trailers only by enlarging the physical size of the invention.

Although the invention is particularly described with reference to repair apparatus shown in U.S. Pat. Nos. 3,630,066 and RE 31,636, any suitable pull or push platform system will work with the invention. The invention can be mounted flat on the floor to work with the floor type pulling systems or can also be mounted on the so-called bench systems.

Because this invention accomplishes all of the following as one unitary apparatus. The lifting of the vehicle, the centering of the vehicle to the platform system and/or measuring device, leveling of the vehicle to the platform system and/or measuring device, the holding or anchoring of the car firmly while corrective pulls or pushes are being made during repairs, results in faster and better repair, yet the majority of the unit stays completely assembled at all times, requiring only minor adjustments to be made to fit each vehicle and less set-up time before the repair process can begin.

A yet further object of the invention is to provide apparatus and methods for repairing vehicles to a correctly measured standard with a minimum of effort on the part of the operator. Since substantially all of the measuring system is constructed as a part of the platform system, there is no need to disassemble the unit between jobs. This eliminates the need for storage racks, stands or space within the repair shop to store the measuring system, jacks, lifts, or other large parts necessary to accomplish the needed repairs.

BRIEF DESCRIPTION OF THE DRAWINGS

FIG. 3 is a front elevational view of the device shown in FIG. 2.

FIG. 4 is a side view of the correct dimension and specifications for a given vehicle frame as is typically provided by a manufacturer.

FIG. 5 is a bottom view of the frame of the vehicle shown in FIG. 4.

FIG. 9 is a partial side elevational view of the lift system anchoring or restraining mechanism.

FIG. 10 is a side view of the vehicle anchoring mechanism taken along the line 10—10 of FIG. 9.

FIG. 11 is a top elevational view of the vehicle body clamp base attachment mechanism.

FIG. 20 is a side elevational view of a vehicle frame or body measuring reference pointer used in this invention.

FIG. 21 is a front elevational view of the vehicle frame or body measuring reference pointer shown in FIG. 20.

FIG. 22 is a top elevational view taken along the line 20—20 of FIG. 21.

FIG. 23 is a top elevational view of a two-way level indicator adapted to be clamped to a vehicle frame or body measuring reference pointer of the type shown in FIGS. 20–22.

FIG. 24 is a side elevational view of the vehicle frame or body reference pointer with the level indicator of FIG. 23 thereon.

FIG. 25 is a front elevational view of the vehicle frame or body reference pointer of FIG. 24.

FIG. 26 is a front elevational view of an alternate embodiment of a vehicle frame or body measuring reference pointer.

FIG. 27 is a top elevational view taken along the line 27—27 of FIG. 26 without the vehicle frame or body reference pointer.

DETAILED DESCRIPTION OF THE PREFERRED EMBODIMENTS

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Figure 1:
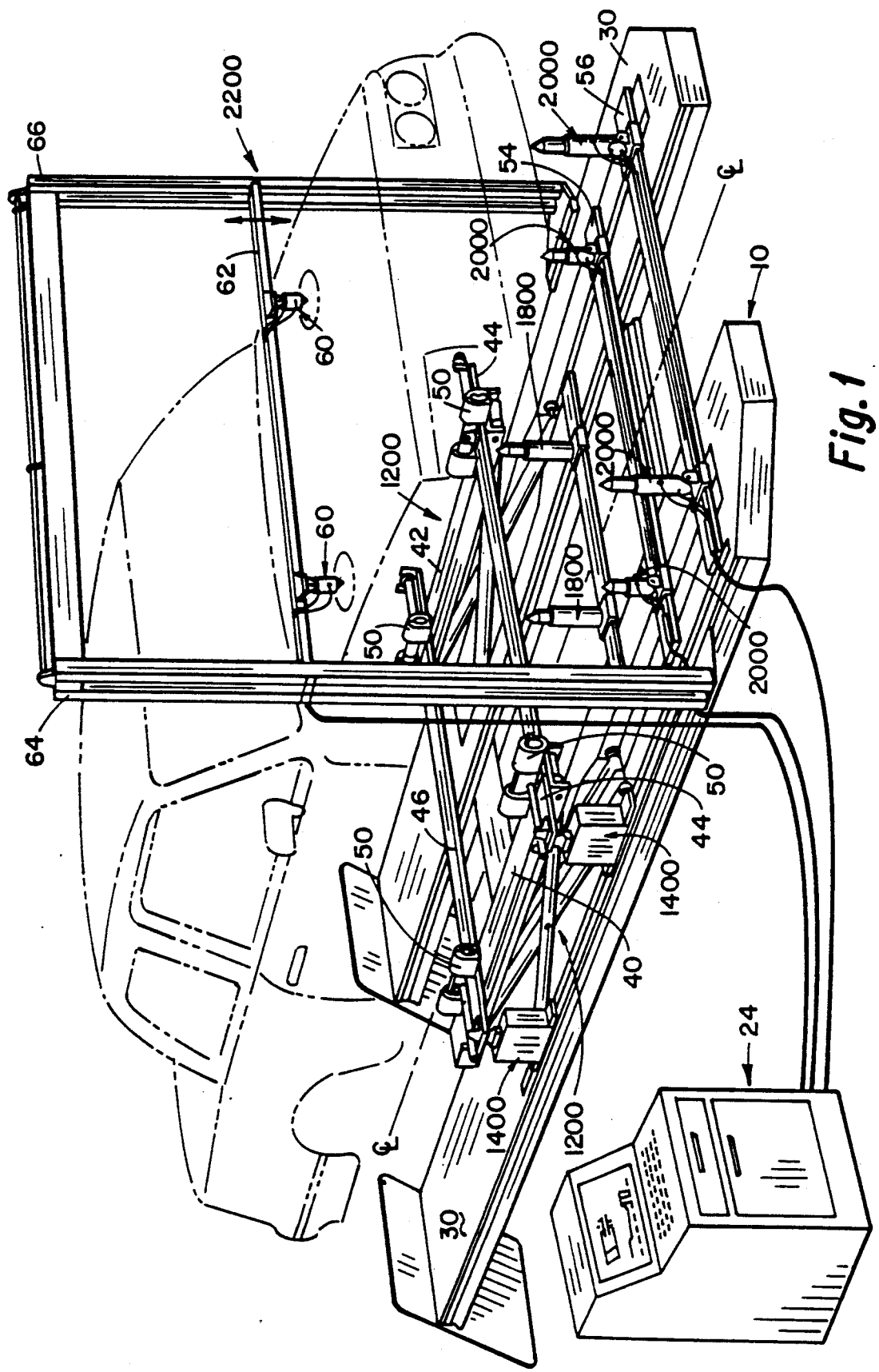
FIG. 1 is an overall perspective view of the invention.

FIG. 1 is an overall view of the basic components of the invention comprising a measuring platform generally indicated by the numeral 10, a dual-track lift system generally indicated by the numeral 1200, a vehicle clamp and retention system generally indicated by the numeral 1400, a plurality of vertically and horizontally movable datum leveling stands generally indicated by the numeral 1800, a plurality of vertically and horizontally movable measuring pointers generally indicated by the numeral 2000, an upper body and frame alignment cross-member generally indicated by the numeral 2200, and a computer generally indicated by the numeral 24.

A vehicle to be repaired is shown in phantom view as it would be positioned with respect to the bench rails or the platform. An important aspect of the invention is that the top 30 of the platform becomes the established datum plane from which all vertical measurements are made and from the longitudinal centerline thereof of which all horizontal measurements are made. This invention is directed to positioning the vehicle so as to be level with the datum plane and wherein a vertical plane through the longitudinal axis of the vehicle intersects the centerline of the datum plane.

The lift system 1200 comprises right and left scissor-type jacks 40 and 42, a forward crossbar 44, and a rearward crossbar 46 which rest upon and/or are attached to the top support surface 1202 (see FIG. 6) of jacks 40 and 42. The crossbars include vehicle body clamp members 50 as will be more fully described herein.

The moveable datum leveling stands 1800 are positioned upon moveable crossbar 52 while the measuring pointers 2000 are attached to one or more horizontal crossbars 54. All of the crossbars are transverse to the centerline of the platform and are adapted for forward and rearward movement therealong as will be hereinafter described.

The upper body and frame alignment cross member 2200 is adapted to make measurements for upper body and/or frame components and/or McPherson strut location utilizing measuring pointers generally designated by the numeral 60 which are adapted to be horizontally moveable along crossbar 62 which is adjustable vertically as shown by the arrow along right and left vertical frames 64 and 66.

Figure 2:
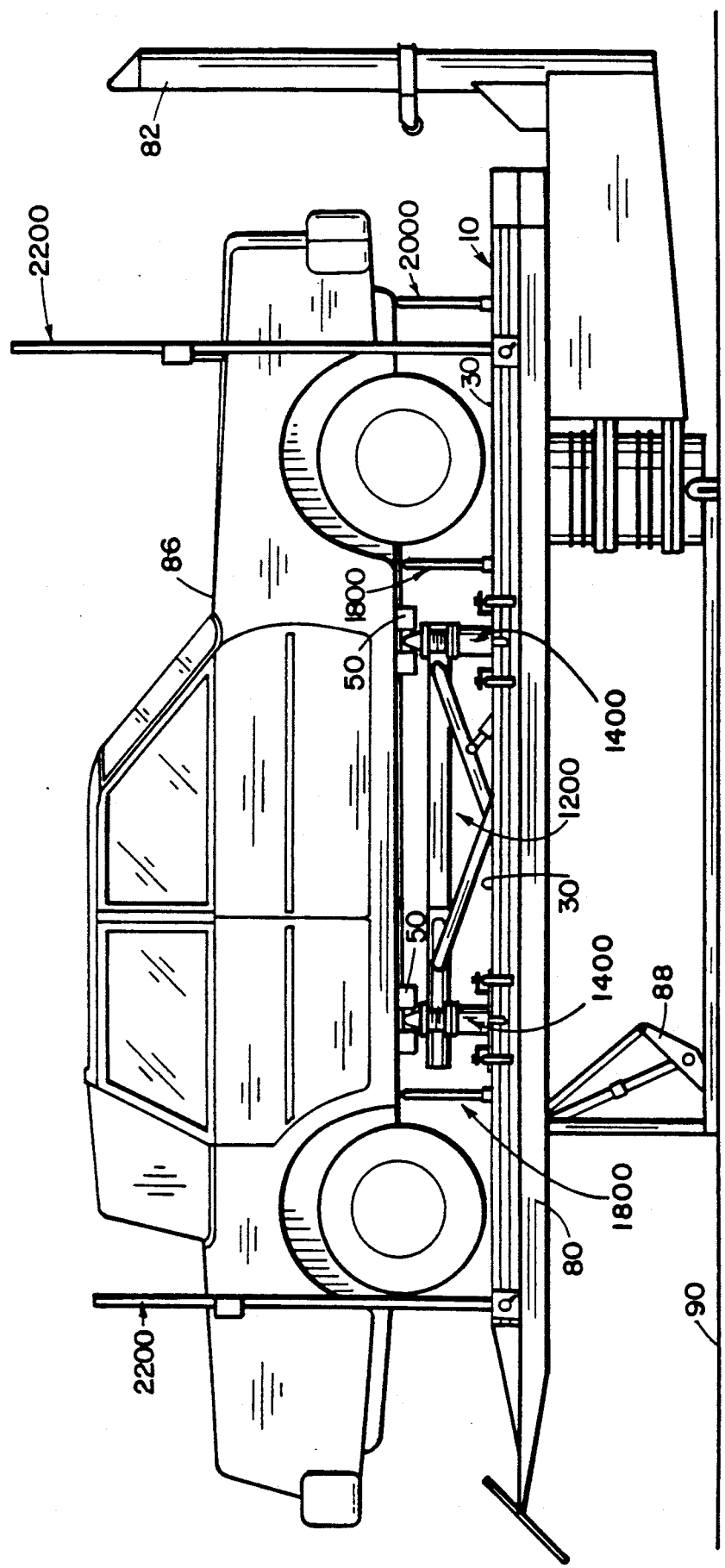
FIG. 2 is a side elevational view of the apparatus of this invention as applied to a conventional body and frame alignment machine.

Referring now to FIGS. 2 and 3, the invention is shown in conjunction with an automobile body and frame alignment machine of the type shown in U.S. Pat. Nos. 3,630,066 and Reissue 31,636 comprising a treadway 80 and a plurality of pull or push force means 82 which can be positioned about the vehicle 86 for repairing the damage thereto. As described in the aforesaid patents, the treadway 80 includes means 88 for raising the treadway above the floor 90 to a first workable position for the mechanic/operator/technician.

Referring now to FIGS. 4 and 5 which are examples of chassis dimension charts—in this particular case a 1988 Chrysler LeBaron GTS. These dimensions and specifications are provided by the manufacturer and/or others and assembled in booklets for body and frame alignment operators as, for example, by KLM Automotive Publishing, Inc. The measurements are based on factory specifications; and in the case of unibody-type vehicles, were measured with the vehicle supported on the pinchwelds found at the front and rear torque box areas. The various measuring points shown in FIG. 4 by the alphabetical letters, represent fixturing holes, bolts, nuts, studs, non-removeable plugs, rivets, and the like. The datum line is an imaginary line or plane which is established at a fixed distance below the vehicle. The datum line is parallel and perpendicular to the vehicle's underbody and is established relative to the various holes, bolts, etc. and becomes a fixed reference plane for all height dimensions.

FIG. 5 is a drawing of the vehicle's underbody; that is, the illustration is drawn as though viewing the vehicle from underneath looking up at the underbody. In FIGS. 4 and 5 many of the dimensions have been omitted, and these drawings are provided only as a sample of the specification and dimensions available to the mechanic/operator. It is this information that can be stored into the computer/comparator 24 that will allow the technician/mechanic, in the use of this invention, to determine the exact areas of the frame or body that need to be corrected, and after repair, that such corrections meet the manufacturer's specifications.

LIFT JACK

Figure 6:
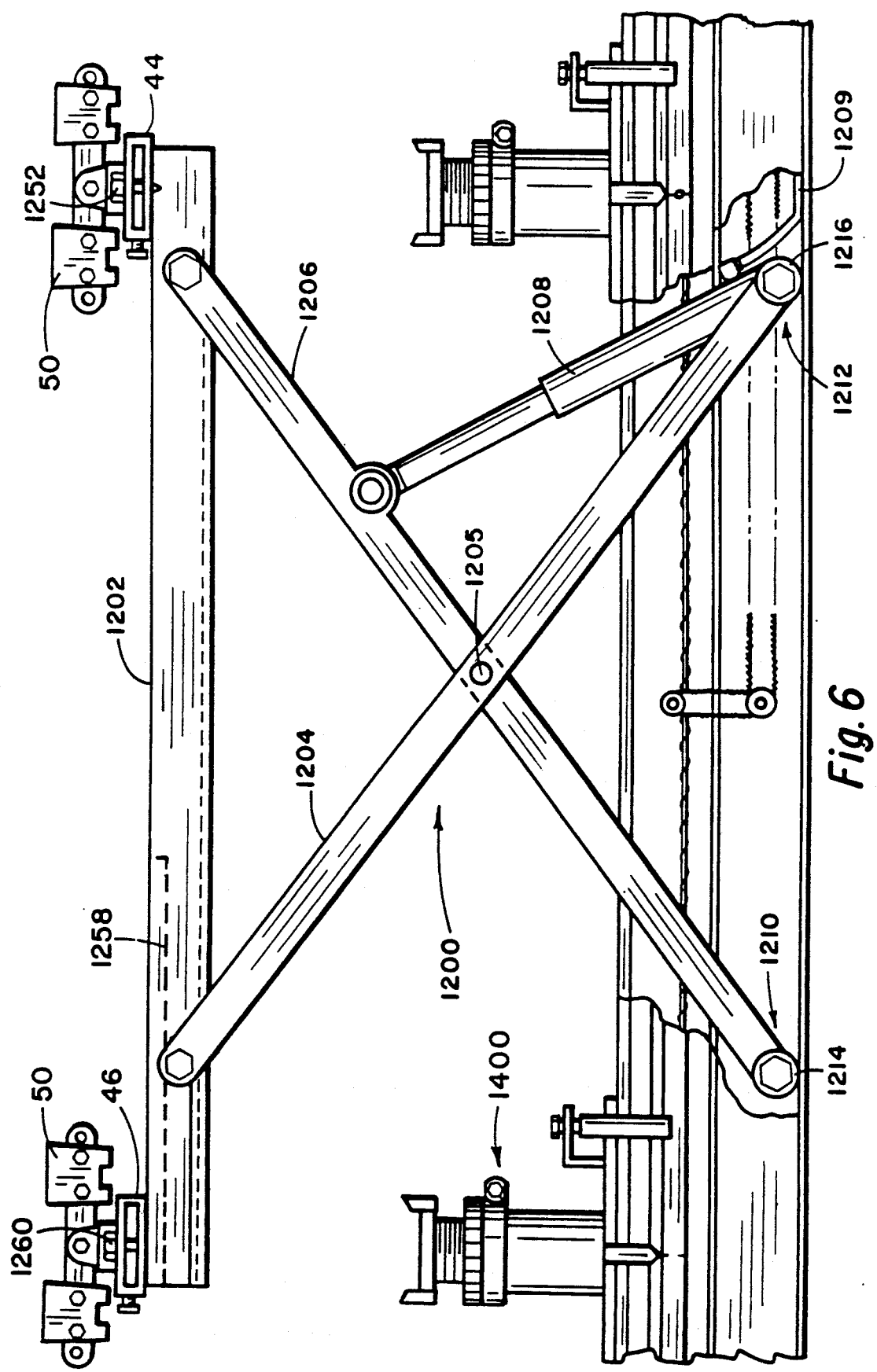
FIG. 6 is a side elevational view of the vehicle lift system as used in this invention.
Figure 7:
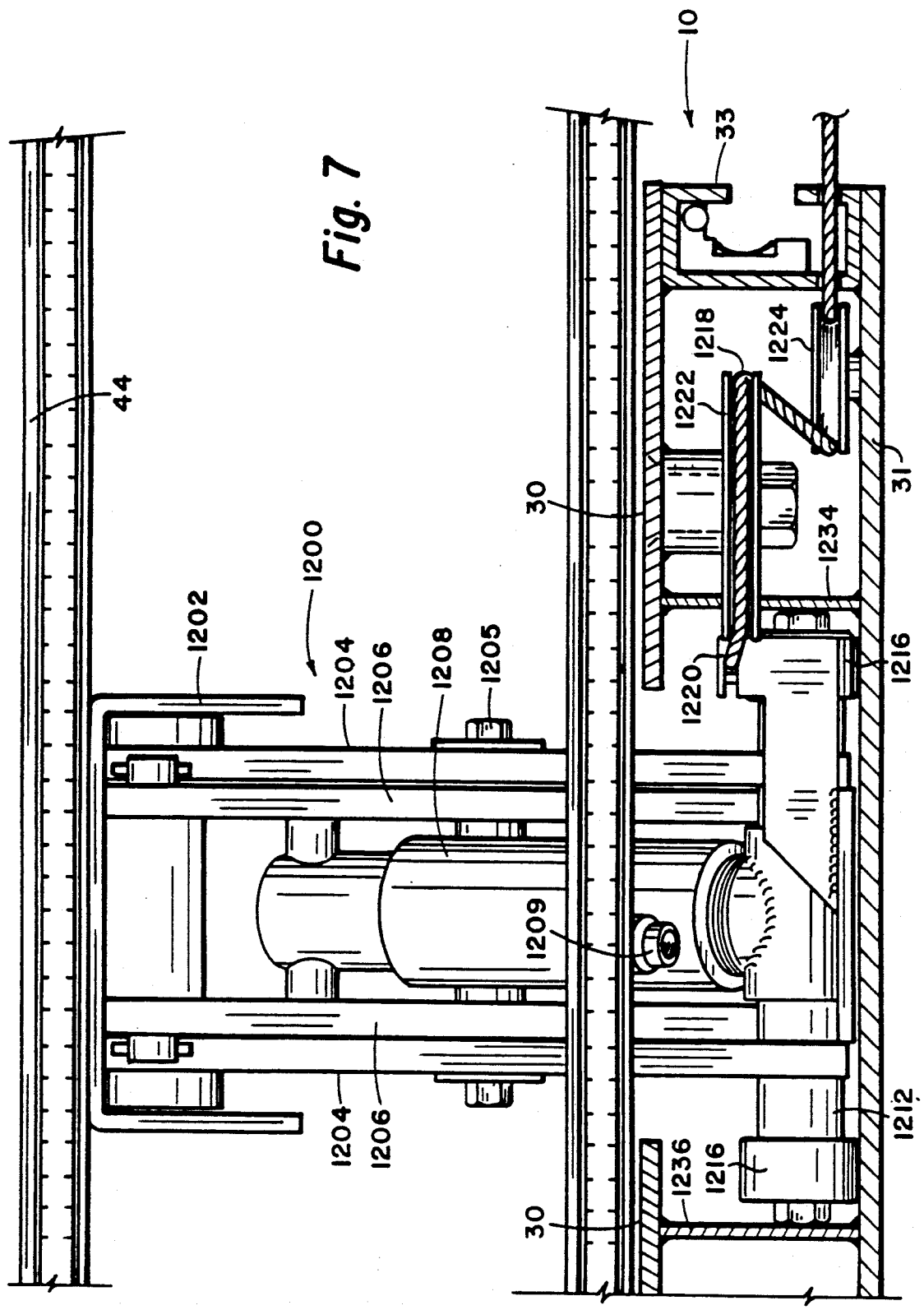
FIG. 7 is a partial frontal view of the lift system of this invention.
Figure 8:
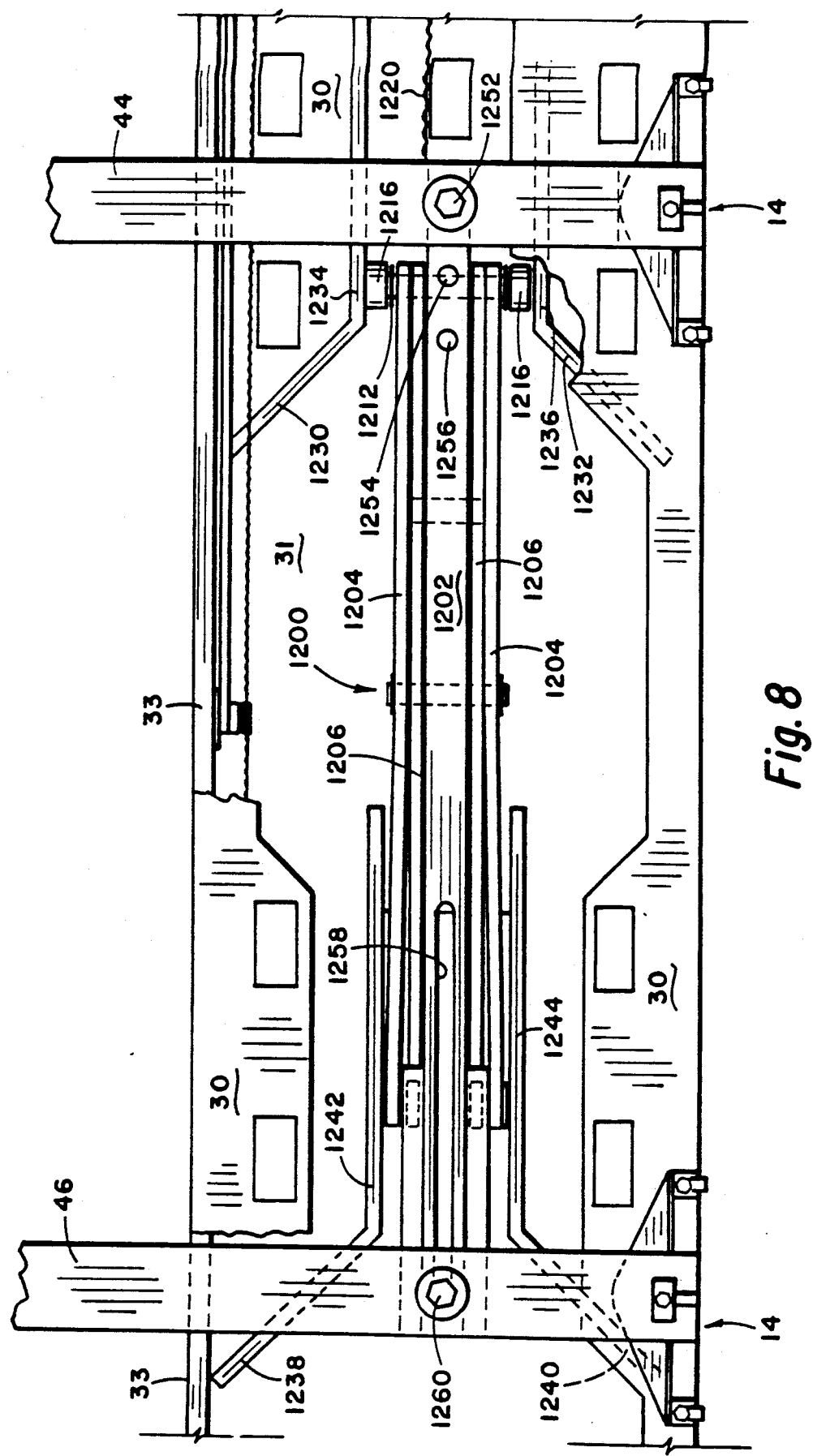
FIG. 8 is a top partial sectional view of the lift system centering mechanism.

Referring now to FIGS. 6, 7, and 8, the lift jack 1200 and the vehicle centering system is described. The lift jack comprises a horizontal vehicle support arm 1202 supported by two sets of parallel crossbars 1204 and 1206, the latter being moveable by a fluid powered, i.e., hydraulic or pneumatic, cylinder-piston arrangement 1208. The two cross members are pivotally connected at 1205. Hydraulic pressure fluid is supplied via connection 1209 for actuating the lift jack. The lower end of the crossbars 1204 and 1206 are supported upon transverse axles generally designated in FIG. 6 as 1210 and 1212. The jacks are to be longitudinally movable. To do so, the outer ends of the axles are provided with roller wheels 1214 and 1216.

One method of moving the jack lift system to center the vehicle on the platform utilizes cable 1218 attached at one end to the lift jack at clamp 1220, traversing around pulleys 1222 and 1224 to the identical jack lift system 1200 on the left side of the platform 10. The cable 1218 is utilized to pull the jacks, and the attached vehicle, as will hereinafter be described, into a centered position relative to the datum plane 30 of the platform system such that the centerline of the vehicle will be parallel with the centerline of the datum plane 30. The pulling force to move the jacks can be accomplished in a variety of ways, for example, using the push-pull force mechanisms of the frame straightening machine.

Referring to FIG. 8, the centralizing cam system is shown in conjunction with the lift jack 1200. The system comprises tandem centering guides consisting of the forward guides 1230 and 1232 which are angularly oriented inwardly to the parallel guides 1234 and 1236. The rearward centering guide is identical thereto and is spaced therefrom and comprises the inwardly flaring portions 1238 and 1240 with the parallel inward guides 1242 and 1244. Upon correctly clamping the vehicle to the jack lift system as hereinafter described, the jacks are pulled forward to a position wherein the transverse axles and their guide rollers 1216 are cammed into the space between the parallel guides 1234-1236 and 1242-1244 and thus will locate the vehicle in the centered position relative to the centerline of the datum plane 30.

The platform 30 is formed of the upper datum plane 30 by steel plates and a bottom parallel plate 31 which are connected by a plurality of longitudinal frame members 33.

VEHICLE CLAMP MECHANISM

In the embodiment shown in FIGS. 6 and 8, front crossbar 44 is attached to the top 1202 of each jack-lift using pivot bolt 1252. This permits a pivotal action of the mechanism to place body clamps 50 and the associated assemblies as shown in FIGS. 9, 10 and 11 at the proper locations on the frame. The rearward crossbar 46 is also pivotally connected to top 1202 into slot 1258 using bolt 1260. This permits longitudinal movement of the crossbar to a desired pinch weld or other clamp point on the vehicle.

The vehicle clamp and support mechanism basically comprises transverse crossbars 44 and 46 which are attached to and/or supported upon the leveling and lift jack system and in particular on the top of plates 40 and 42 (see FIG. 1) and numbered 1201 in FIG. 6.

Referring now to FIGS. 9, 10, and 11, the clamp assembly comprises a lower base assembly 4402 and an upper base assembly 4404. The lower base assembly is slidably attached to the cross member 44 and positionable on each side of the vehicle so as to allow pinchweld clamps 50 to be located and attached to the appropriate pinchweld locations on the vehicle provided such locations are properly aligned as per the manufacturer's specifications. The lower base includes a viewing window 4406 which includes a pointer 4408 for use in conjunction with the transverse measuring tape 4410 which is formed as a part of the crossbar 44 and provides measurements that are transverse to and from the centerline of the platform. Bolt assemblies 4412 and 4414 engage button 4416 (see FIG. 10) against the measuring tape groove and thus affix the clamp to the cross member 44. The upper clamp base assembly 4404 is connected to the lower base 4402 by an adapter 4417 forming an arcuate opening 4418 and retained by pin 4420 which is kept within upright members 4422 and 4424. In the body and frame repair industry there are many and varied types of mechanisms for providing a clamping action to the vehicle chassis frame or unibody as the case may be. Thus the upper clamp assembly is adaptable to a variety of well known devices to accomplish clamping of the vehicle. In order to provide additional strength during the pulling and/or pushing operations against the vehicle, additional support to the vehicle clamp mechanism is provided by a threaded rod 4430 which is connected at one end to a bolt 4432 that is affixed to the lower base assembly 4402 and at the other end to an L-shaped brace 4434 which is attached to the crossbar 40 by a bolt 4436. Tension-like adjustment is provided to the threaded arm 4430 by the use of bolts 4438 and 4440 which form a rigid connection from the pinch clamp 50 through the upper base 4404, thence through the lower base 4402, thence through the threaded arm 4430 to bolt 4436 to the anchoring mechanism 1400 which interconnects with the platform 10. The threaded arm 4430 also permits fine adjustments to ensure that the vehicle is centered on the platform system.

VEHICLE ANCHOR MECHANISM

Figure 12:
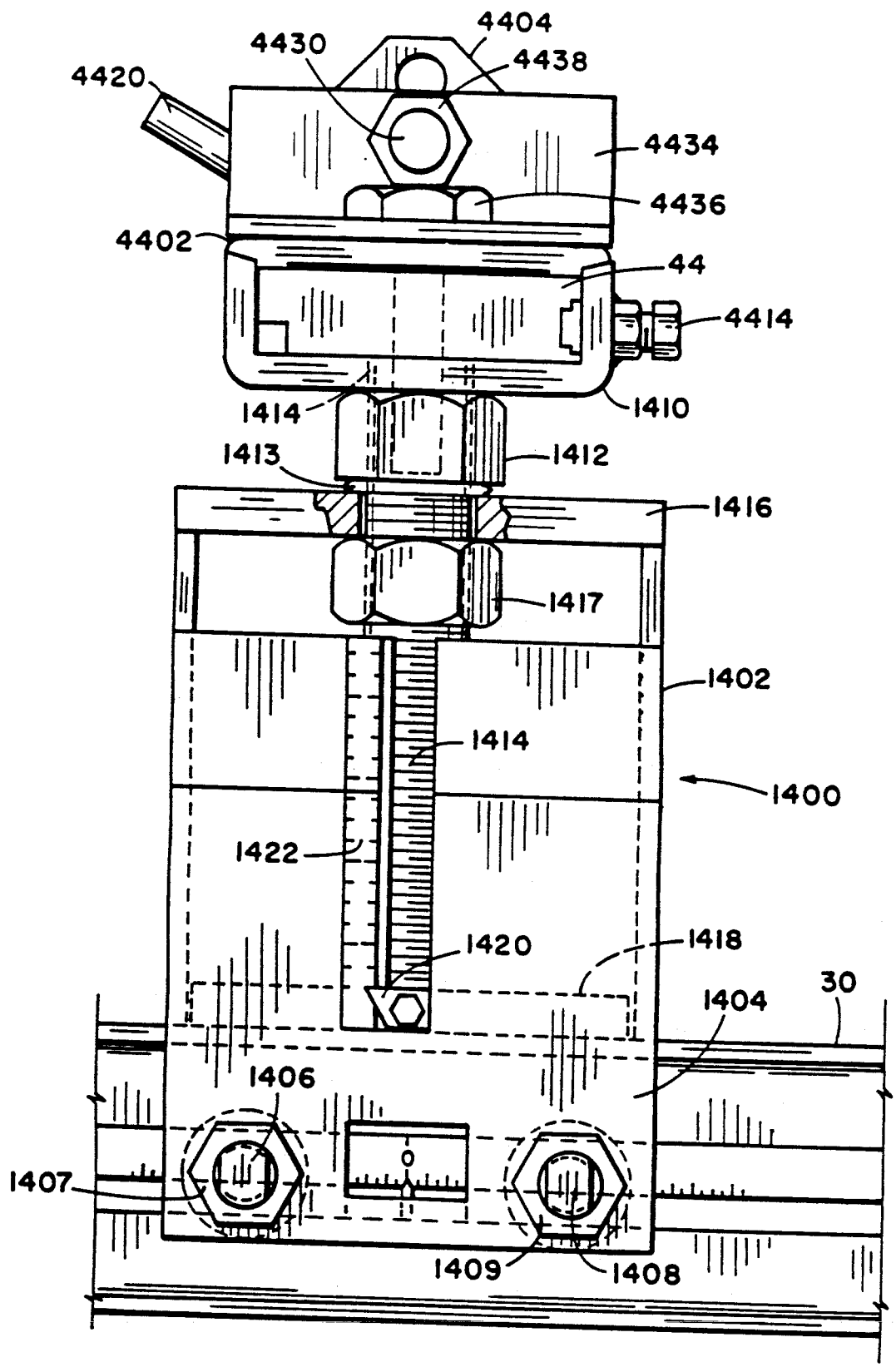
FIG. 12 is a side elevational view of the vehicle restraining apparatus.
Figure 13:
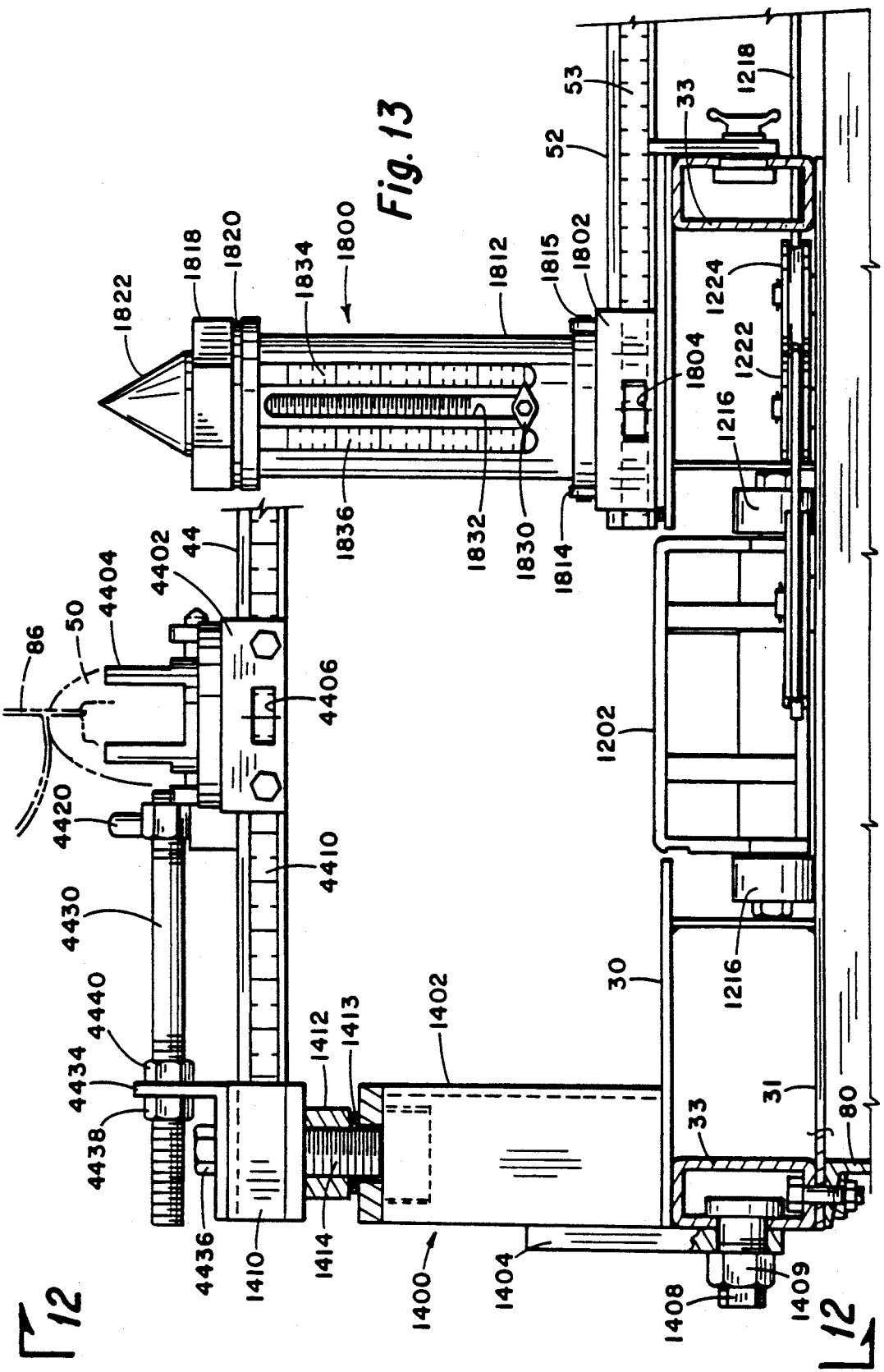
FIG. 13 is a front partial elevational view of the vehicle restraining system and a vehicle reference pointer.

Referring now to FIGS. 12 and 13, one form of the vehicle crossbar anchoring mechanism is shown designated generally by the numeral 1400. The device comprises an anchor frame 1402 which can be attached to the top of the platform 30 by means of a bracket 1404 which is retained to the sides of the platform by bolts 1406 and 1408 and nuts 1407 and 1409. Above the anchor frame 1402 is a U-shaped receptacle 1410 which is adapted to receive the ends of crossbar 44. A threaded shank 1414 is attached at its top end to receptacle 1410 and extends through a hole in top plate 1416, formed as a part of the frame 1402, thence downwardly into the housing 1402 and attached to a platelike nut, shown dotted as 1418, to which a pointer 1420 is attached. A first adjusting nut 1412 is attached to shank 1414 above a thrust bearing 1413 which rests upon top surface 1416. A second adjusting nut 1417 is below surface 1416. These nuts act to raise or lower the shank 1414, receptacle 1410, and the clamped vehicle. In this embodiment a measuring tape 1422 is provided on the side of the frame 1402 for purposes of leveling the vehicle to the platform datum plane 30. The vehicle body anchoring mechanism of FIGS. 9 and 12 is provided at each end of the crossbars 44 and 46.

Figure 14:
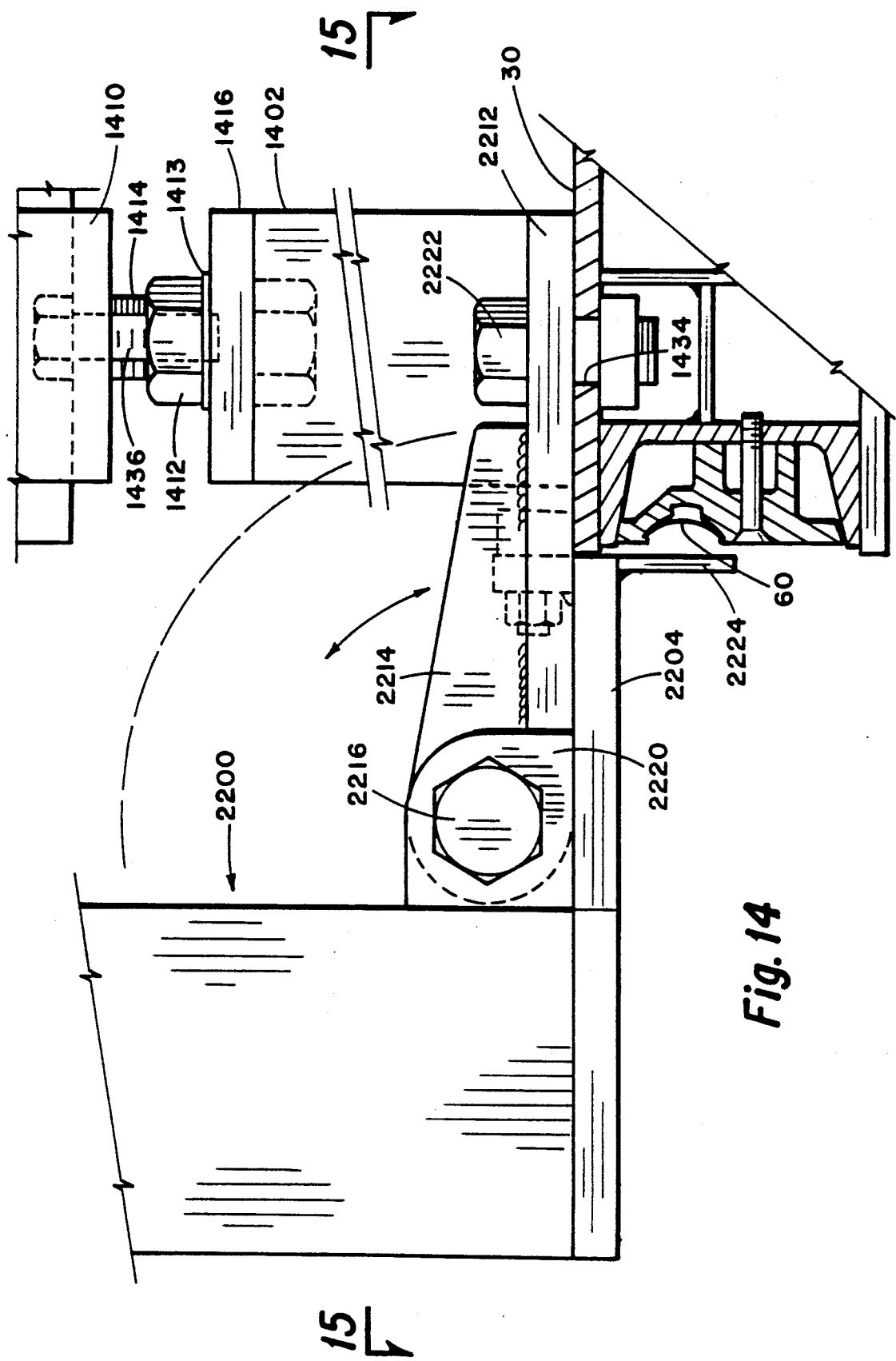
FIG. 14 is a partial front view of an alternate form of vehicle anchor mechanism and an overhead measuring apparatus.
Figure 15:
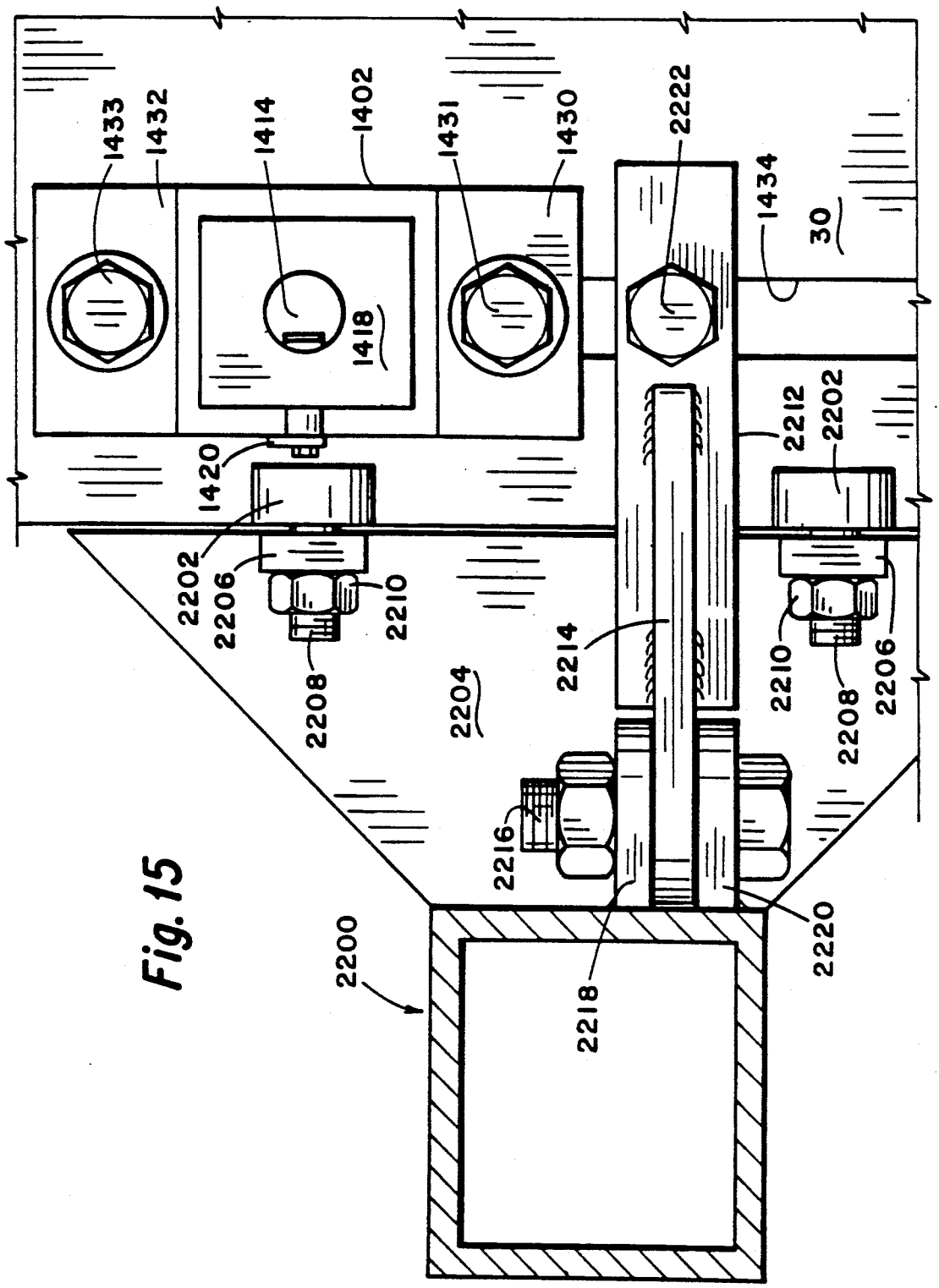
FIG. 15 is a top, partial sectional view taken along the line 15—15 of FIG. 14.

FIGS. 14 and 15 represent an alternate embodiment of the invention for anchoring and transversely leveling the vehicle. In this embodiment the anchor frame 1402 includes opposed flange members 1430 and 1432 which are retained to the platform 30 by respective bolt and nut assemblies 1431 and 1433 through slot 1434 which runs longitudinally along the top of the platform and datum plane 30. In this embodiment the upper vehicle body measuring system generally designated by the numeral 2200 and hereinafter described in greater detail includes a roller 2202 which is supported to lateral frame 2204 by a bearing block 2206 by a bolt 2208 and nut 2210. The upper vehicle body measuring system can be anchored to the platform 30 by means of tie-down plate 2212 which has a strengthening gusset 2214 and is pivotal about bolt 2216 between blocks 2218 and 2220. A bolt and nut assembly 2222 retains the tie-down plate 2212 to the platform 30. In the event it is necessary to move the upper vehicle body measuring system, nut and bolt system 2212 is removed and the plate 2212 pivoted upwardly, allowing the system to roll along the platform to another position which may be on the other side of the anchor frame 1402. An alternate embodiment of the invention includes a recess 1436 formed as a part of bolt 1414 which would replace the measuring indicia means 1420 and 1422 shown in FIG. 12. The measuring tape would, of course, be oriented 90° from the view shown in FIG. 14.

LEVELING MECHANISM

To further assure that the vehicle is level with respect to the datum plane 30, leveling devices generally designated by the numeral 1800 are supported on crossbar 52 along which they may be slidably moved and locked in position. The crossbar 52 is movable longitudinally along the platform datum plane 30 to a desired vehicle frame reference point. The leveling stands 1800 comprise a base 1802 (referring to FIGS. 13, 16 and 17) which on one side has an indexing opening and pointer 1804 that provides readings relative to a measuring tape 53 formed as a part of the crossbar 52. On the opposite side of the base are means such as bolts 1806, lock nuts 1808, and pad 1810 which is operable relative to a groove in the crossbar 52 to position and lock the leveling stand 1800 in a desired position relative to a given datum reference point on the vehicle. The stand includes an assembly of an outer housing 1812 which is attached to a pivotal bottom member 1814, the purpose of which is to permit the leveling stand to be pivoted into a substantially horizontal position during the time period when the vehicle is positioned upon the platform and lifted into position without having to remove the leveling stands prior thereto. Internally of the leveling stand body 1812 is a threaded sleeve 1816 to which a nut 1818 is threadably attached at the top. A thrust bearing 1820 is provided between the bottom end of the nut and the top end of the leveling stand body 1812. Interiorly of the sleeve 1816 is a pointer means 1822 which is biased normally in tension by spring 1824, which is concentrically supported between plate 1826 attached to the inside of threaded sleeve 1816 and the inside of the pointer sleeve 1822. Attached to the threaded sleeve also is an indexing pointer 1830 which is adapted to ride within slot 1832 formed as a part of the body 1812 relative to two measuring tapes 1834 and 1836 recessed within the side of the body and best shown in FIG. 13. One tape indicates height measurements taken from the manufacturer's specifications while the other tape provides the actual height measurement from the platform datum plane.

The leveling stand 1800 is utilized within the invention to assure that the vehicle frame is level relative to the datum plane 30. The device is typically used with respect to predetermined openings within the frame or body of the vehicle such as shown dotted in FIG. 15 at 87. The leveling stand pointer thus is able to be positioned relative to the opening; and since the height of opening 87 relative to the datum plane 30 is known or determined from the published specification chart (see FIGS. 4 and 5), the inner threaded sleeve 1816 is raised to that distance and locked into place by the nut 1818, thus compressing spring 1824 as shown in FIG. 15 and as described hereinafter. An important aspect of the invention is that the leveling stands are pivotally connected to the base 1802 so that it will lay flat and out of the way when the vehicle is placed on the platform.

MEASURING POINTER SYSTEM

Figure 18:
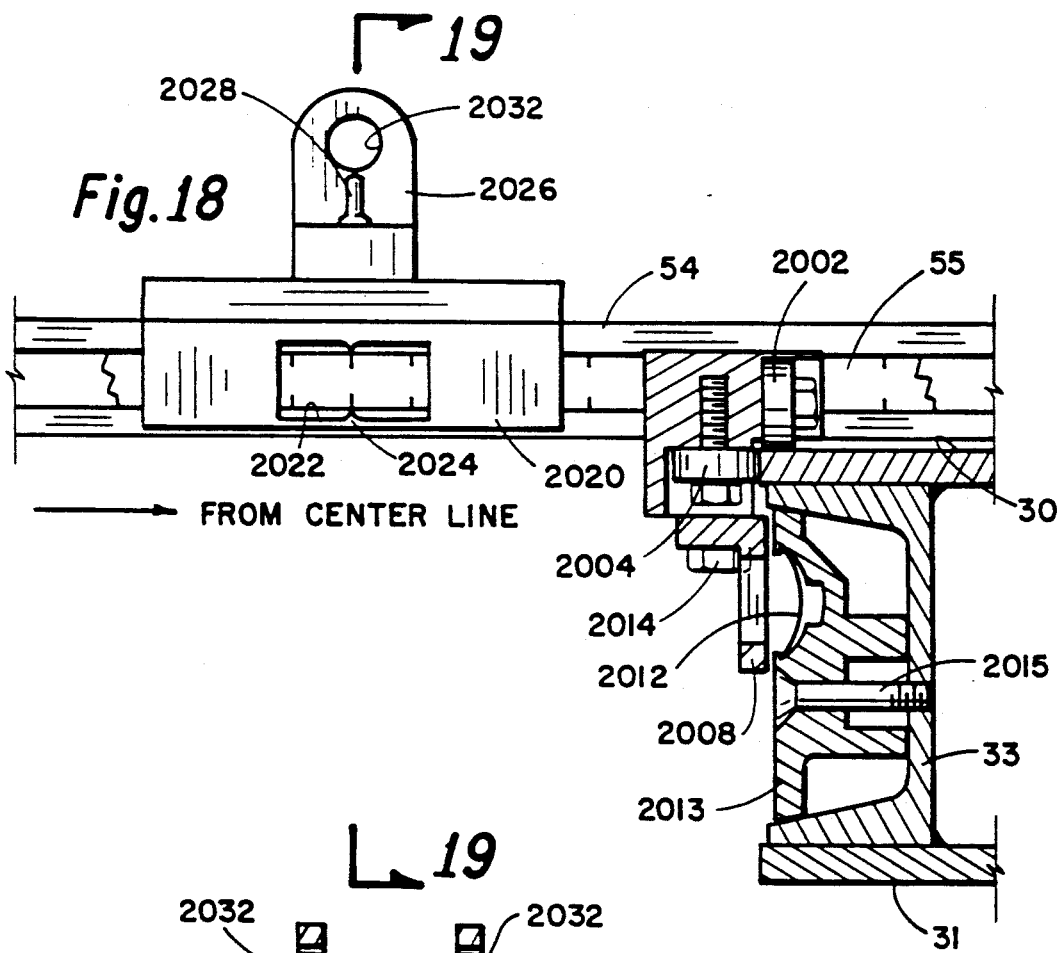
FIG. 18 is a front elevational view, partly in section of a measuring crossbar system used with this invention.
Figure 19:
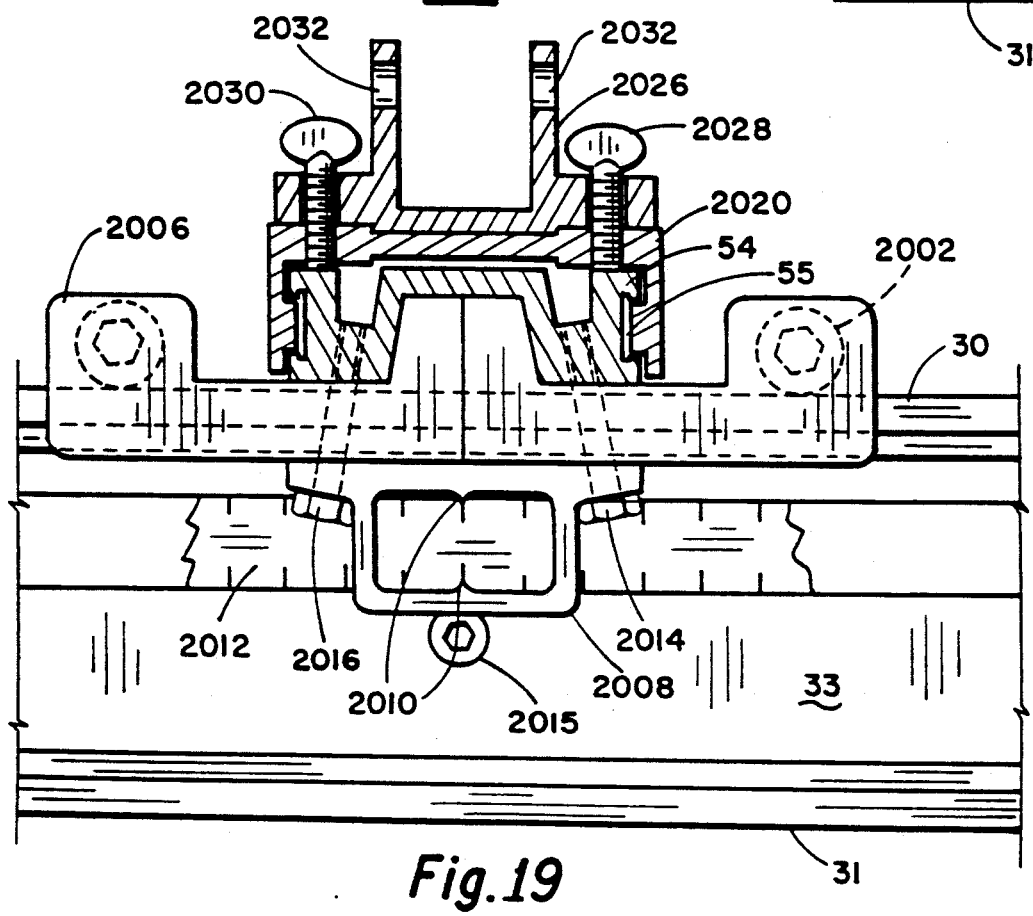
FIG. 19 is a sectional view of the measuring crossbar taken along the line 19—19 of FIG. 18.

FIGS. 18 and 19 represent the connecting mechanism for the measuring pointers 2000 hereinafter described. The measuring pointer's crossbars 54 and 56, 54 being shown herein, extend transversely to the centerline of the platform and are supported thereon by rollers 2002 and 2004 which are supported by bracket 2006. A view finder or window 2008 is attached to the bottom of the bracket 2006 and includes pointers 2010 for providing an indication of the location of the crossbar 54 of its longitudinal position, i.e. parallel to a vertical plane through the centerline of the vehicle. Bolts 2014 and 2016 are threadably attached to the crossbar 54, sandwiching the bracket 2006 therebetween. The crossbar 54 includes a measuring tape 55 embedded therein in one or both sides of the crossbar. The measuring tape 55 is to provide information to the mechanic/operator as to the distances from the centerline of the vehicle in order to locate slide bar 2020 to an appropriate position relative to a given point of reference on the vehicle frame. A viewing window 2022 and pointer 2024 provide means for positioning the sleeve 2020. Connectable to the sleeve 2020 is the measuring pointer connector 2026. The assembly of the sleeve 2020 and the connector 2026 are releasably clamped to the crossbar 54 by threaded finger bolts 2028 and 2030. Axially aligned openings 2032 formed within the upright portions of connector 2026 provide means for attaching the measuring pointers of the type hereinafter described.

One form of construction of the platform of this invention includes the use of longitudinal channel members 33 as shown in FIG. 18. Support for the longitudinal measuring tape 2012 is provided by an extruded member 2013 which is retained to the channel 33 by bolt 2015.

Referring now to FIGS. 20-23, a preferred form of measuring pointer is described. The measuring pointer is used in the apparatus to provide height information between the datum line or plane 30 to a particular portion of the vehicle frame. In this embodiment the measuring pointer comprises a cylindrical body portion 2040 to which is attached at the bottom end thereof a ball and socket swiveling mechanism generally designated by the numeral 2042 which permits the measuring pointer to pivot from horizontal to vertical within a wide range of vertical angles. Within the cylindrical housing 2040 is a spring-loaded measuring pointer 2044, the spring being indicated by the numeral 2045. The pointer 2044 has a pointed tip for exact placement within a bolt hole or upon a bolthead or other designated datum reference point on the frame to be measured. Two measuring rulers 2046 and 2048 are recessed within the longitudinal length of the pointer so as to provide information to the mechanic/operator as to the vertical height from the datum plane. One measuring ruler provides the distance from the datum plane to the top of the pointer while the other measuring rule provides information as to the distance from the datum line as required by the specifications such as shown in FIG. 4. The ball socket joint 2042 is attached to slide 2050 which can then be clamped in a desired transverse position relative to the centerline of the datum plane. A horizontal longitudinal bubble level 2052 and a horizontal transverse bubble level 2054 are provided to be attached to the lower end of the measuring pointer housing 2040 in order to provide additional information to the operator/mechanic during the straightening process.

A clamp-on level, shown in FIG. 23, is adaptable for attachment to the measuring pointer housing 2040 at any position desired by the operator. The device comprises a housing 2060 which has a first bubble level 2062 and a second bubble level 2064 which are transverse to each other. The device is attachable to the housing and clamped using bolt 2065. FIGS. 24 and 25 depict the attachment of this alternate embodiment to the measuring pointer.

FIGS. 26 and 27 depict another form of interconnection of the measuring pointer to the crosspiece. In this embodiment the end of the cylindrical housing 2040 includes a spherical ball member 2066 which is operable within an indented portion 2067 formed as a part of the adjustable slide indicator 2068 which slides along crossbar 54 to the desired transverse position.

Figure 29:
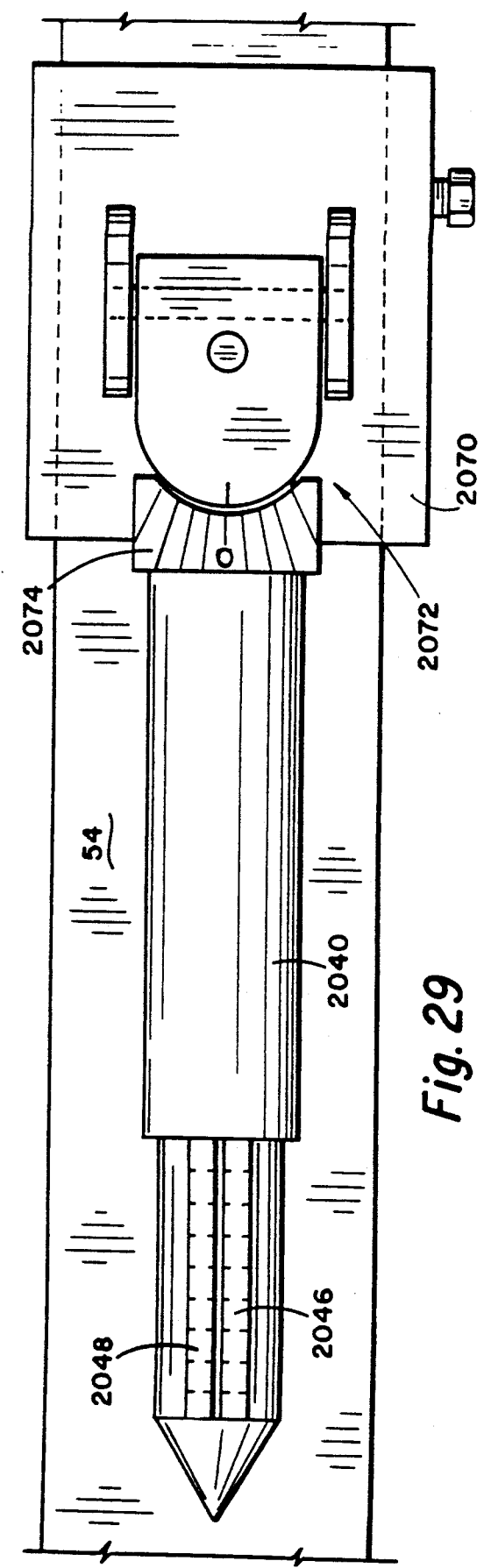
FIG. 29; is a top elevational view of the device in FIG. 28.
Figure 28:
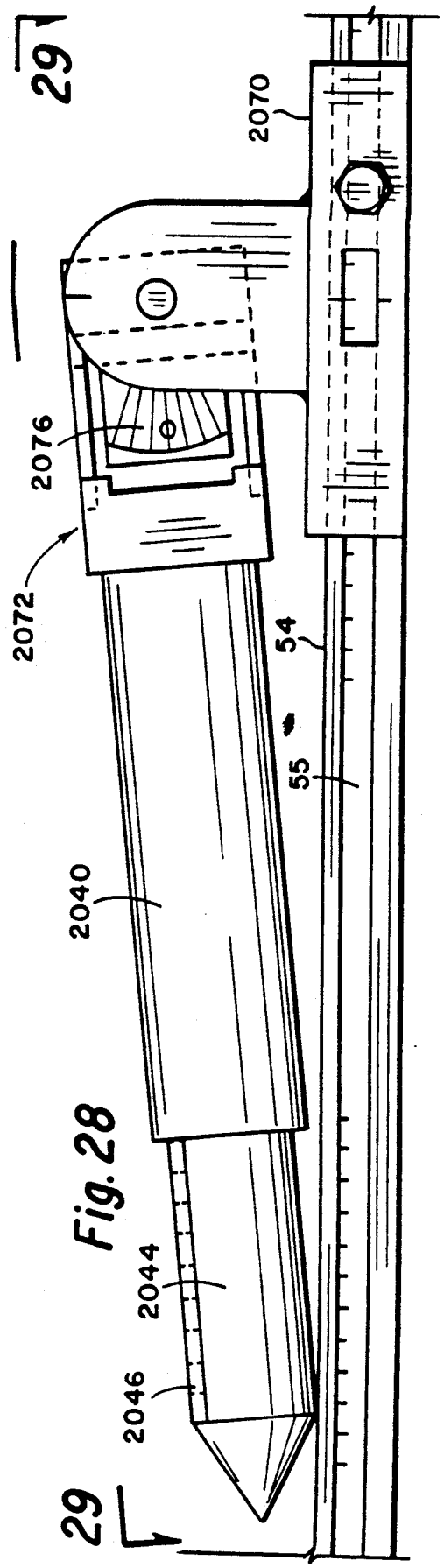
FIG. 28 is a side elevational view of an alternate U-joint form of vehicle frame or body measuring reference pointer.

FIGS. 28 and 29 depict a yet additional modification of the measuring pointer with like parts being denominated with like numerals as shown in FIGS. 20-22. In this embodiment, however, the measuring pointer is connected to an adjustable slide 2070 by a U-joint type of connection generally designated by the numeral 2072, which permits the measuring pointer to be oriented in a multiplicity of directions, horizontally and vertically. Suitable angular measuring indicia 2074 and 2076 provide visual means for the operator to determine the vertical orientation of the measuring pointer.

UPPER BODY MEASURING

Figure 30:
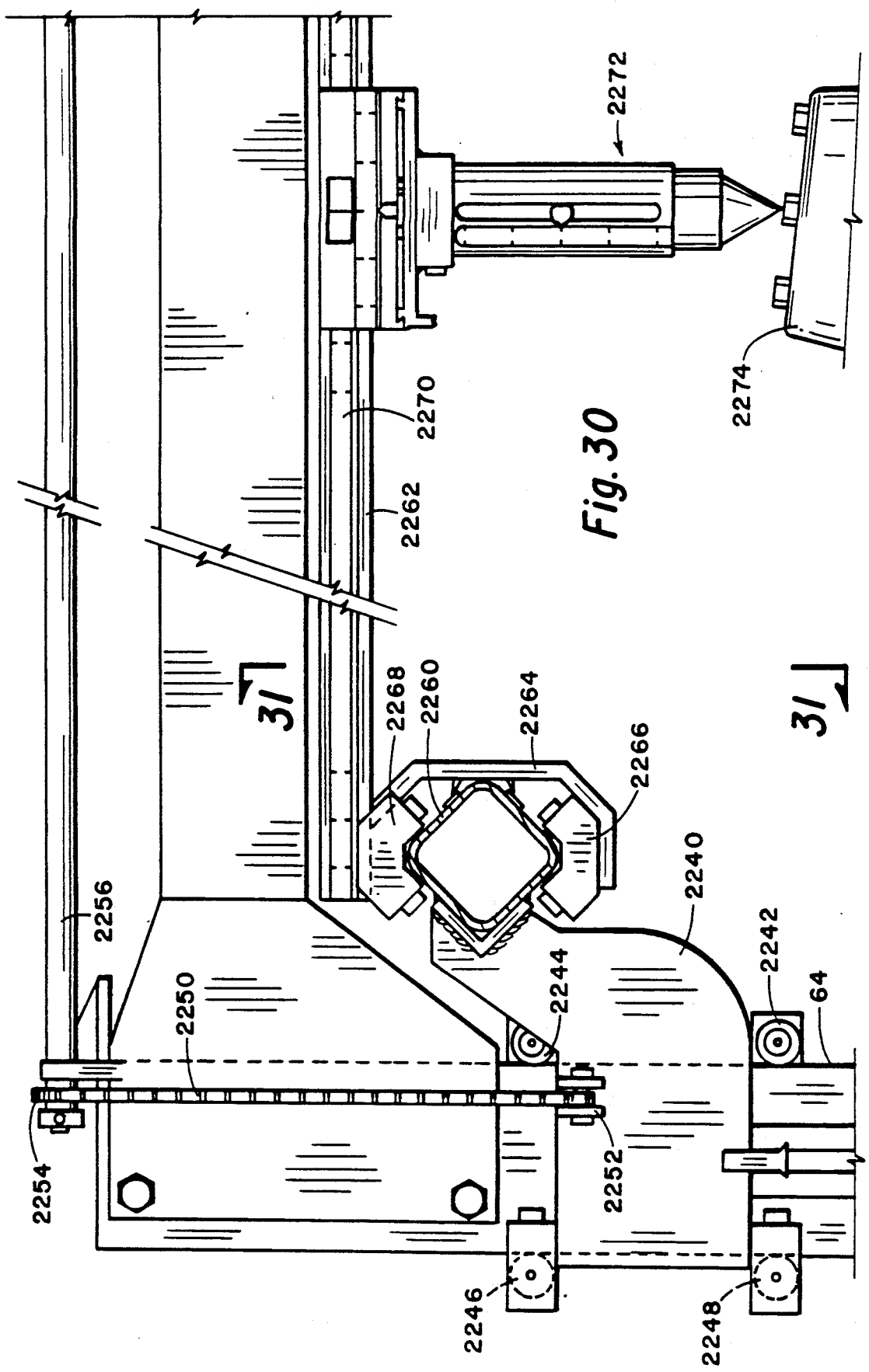
FIG. 30 is a partial sectional view of an upper vehicle body and frame measuring device for use with the invention.
Figure 31:
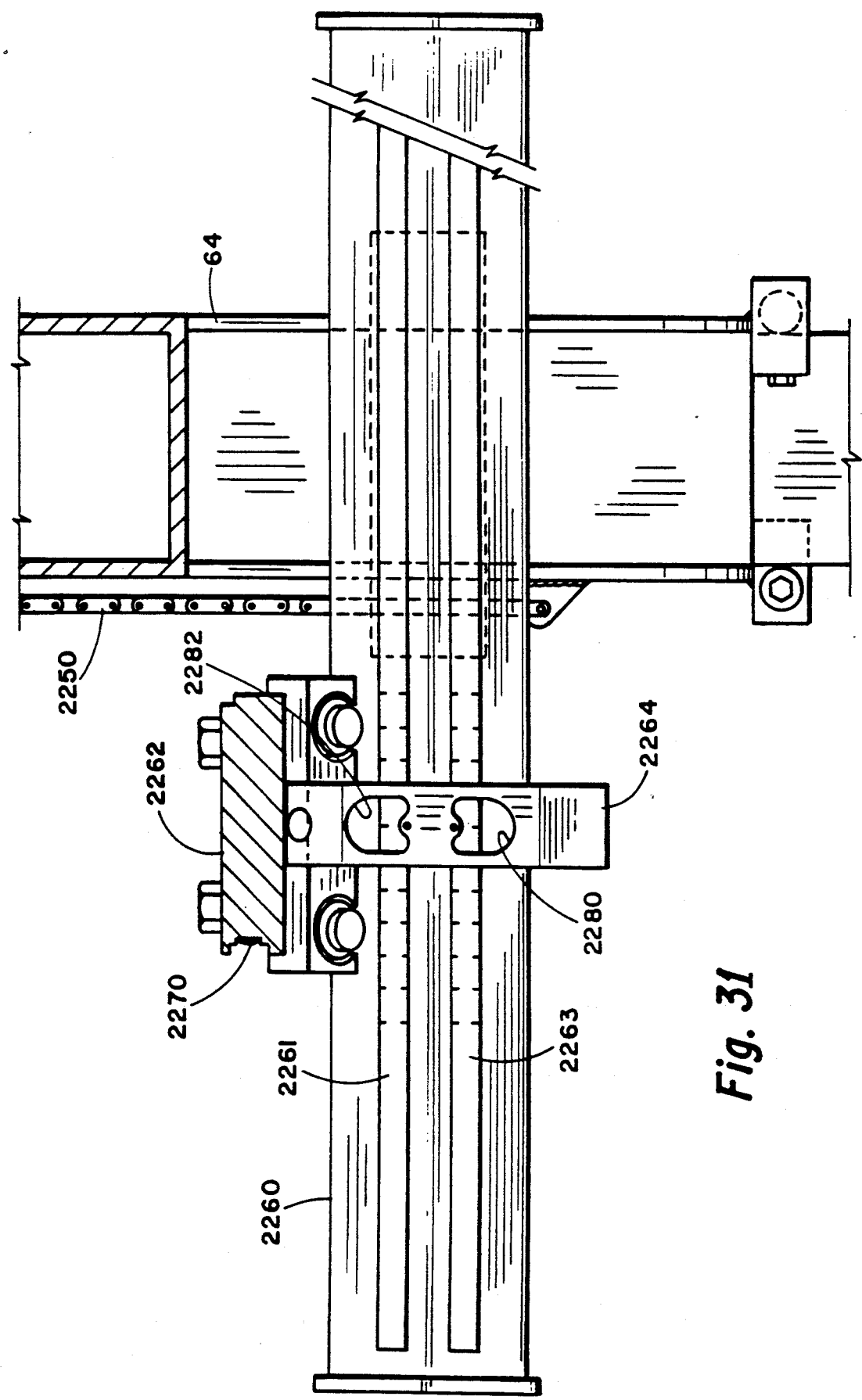
FIG. 31 is an inside elevational view, partly in cross-section, taken along the line 29—29 of FIG. 28.

Another form of upper body measuring device is shown in FIGS. 30 and 31 wherein the vertical members 64 and 66 are modified to receive frame 2240 which is adapted to roll upwardly and downwardly along the vertical posts 64 by means of rollers 2242, 2244, 2246, and 2248. Chain 2250 is attached at one end to bracket 2252 located on the frame 2240 while the other end extends over a sprocket 2254 attached to rotatable rod 2256 with the other end of the chain 2250 extending downwardly in or along the vertical post 64 to a counter weight, not shown, for allowing the frame 2240 to move upwardly and downwardly with ease. A longitudinal conduit-like framework 2260 is attached to frame 2240 and represents the longitudinal axis. Slidably attached to the conduit 2260 is a crossbar 2262 via frame 2264 and supporting roller blocks 2266 and 2268. Crossbar 2262 includes a measuring tape 2270 which gives indication of measurements transverse to the centerline of the vehicle. A vertical measuring pointer of the type heretofore described is generally indicated by the numeral 2272 and is adapted for movement along the crossbar 2262 in a variety of directions. Measuring pointers such as shown in FIGS. 20-29 can be used. In the embodiment shown the measuring pointer is positioned over a McPherson strut housing 2274.

The longitudinal crossbar 2260 may also include suitable measuring tapes 2261 and 2263 to assist in positioning transverse crossbar 2262 in the proper longitudinal position parallel to the centerline of the vehicle. Suitable viewing windows 2280 and 2282 are provided.

Another embodiment of the invention includes the use of a computer. As such, sensors (such as motion detectors such as manufactured by Spectron Glass and Electronics, Inc.) would be provided on the measuring pointers to provide X, Y, and Z orientation of the pointer, that is, the longitudinal, transverse, and vertical heights of the measuring pointer. This information would then be fed to a computer/comparator 24 which would provide comparative information for the operator to determine the extent of the damage to the vehicle frame and/or body. This information could be shown visually and/or by a printout. This is shown schematically in FIG. 21 with one sensor type lead to the transverse level, another lead to the longitudinal level, and a third lead to the vertical indicator. When the sensors are connected to a computer and a plotter/printer, undamaged or new vehicles can be measured to create a data base and/or specification charts for later use.

Figure 32:
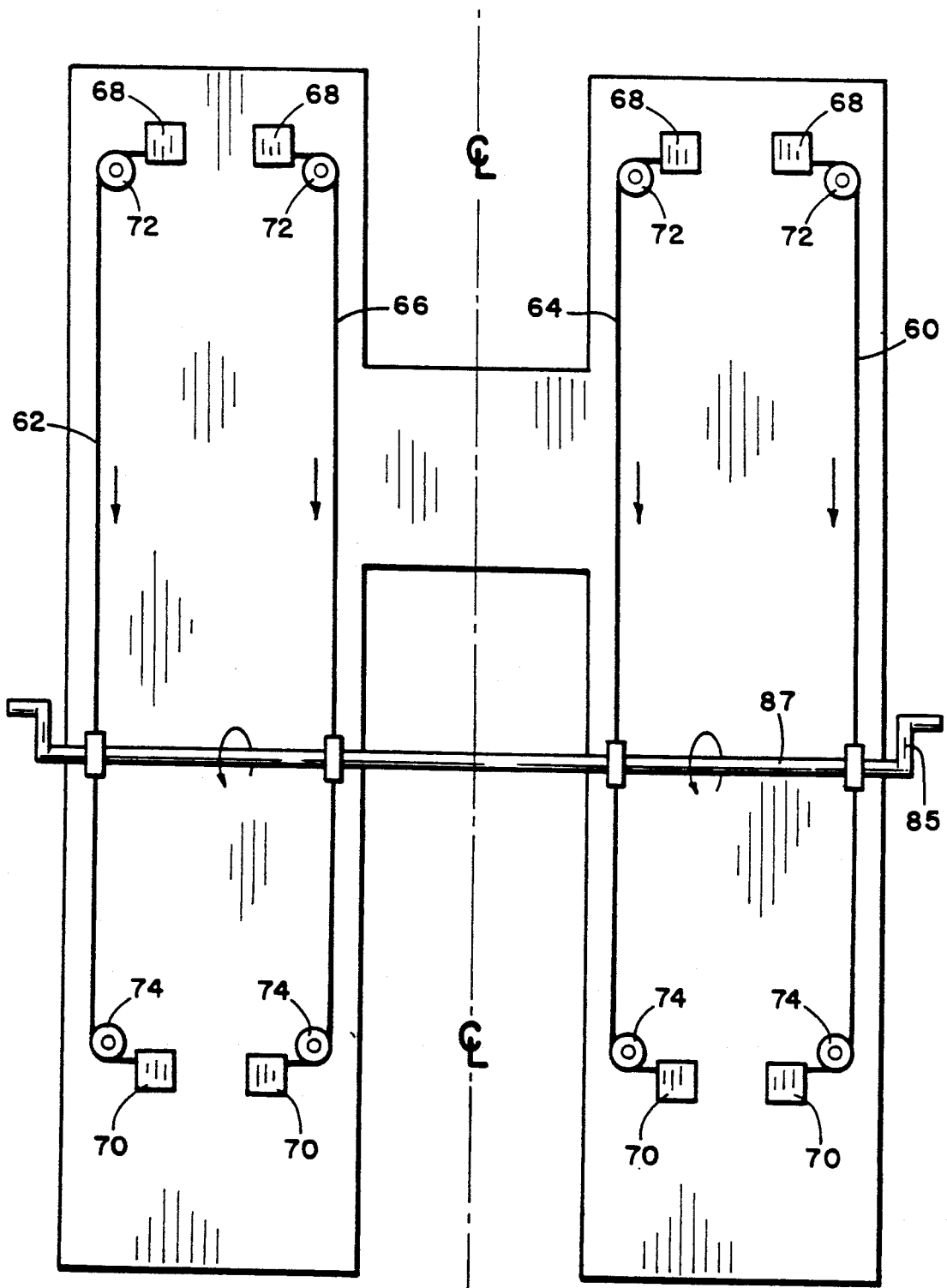
FIG. 32 is a top elevational and schematic view of the movable and longitudinal measuring tape devices used with this invention.

An important aspect of the invention is the longitudinally movable measuring tapes positioned within the platform. In the preferred embodiment four different longitudinally movable tapes are provided on the platform. These tapes are utilized in providing an initial transverse datum or zero point for making longitudinal adjustments and measurements to the vehicle frame or body. FIG. 32 is a top schematic representation of the location of the tapes of this invention. These tapes comprise exterior side viewing tapes 60 (see also FIG. 14 and equivalent tape 2012 in FIGS. 18 and 19) and 62 and interior viewing tapes 64 and 66. These tapes extend within appropriate tracks such as those shown in FIGS. 18 and 19. Each tape comprises reel housings 68 at one end and identical reel housings 70 at the other end, with the tapes being supported and movable by respective rollers 72 and 74. These tapes are connected together such that when moved as, for example, in the direction of the arrows shown, they will be drawn from reel housing 68 and retracted into reel housing 70, and vice versa.

Figure 34:
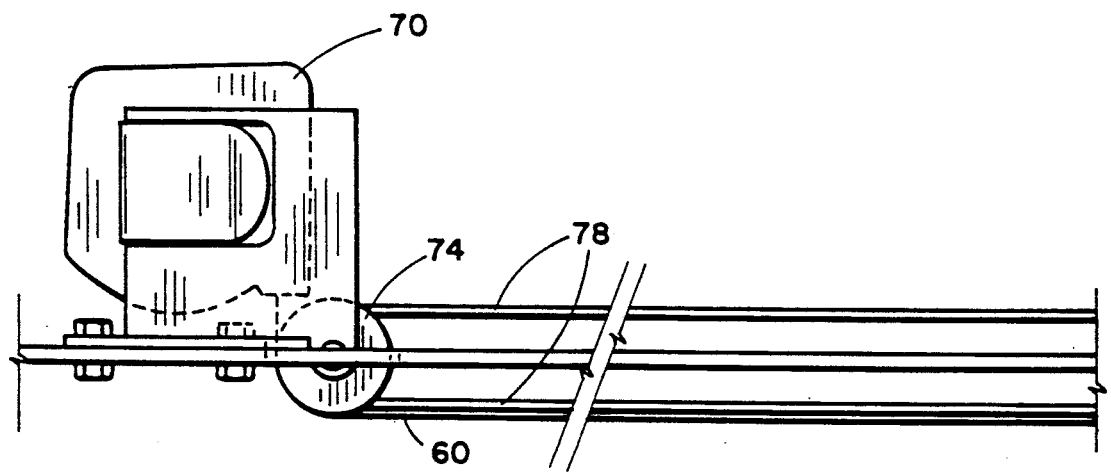
FIG. 34 is a top partial view of the apparatus of FIG. 33.
Figure 33:
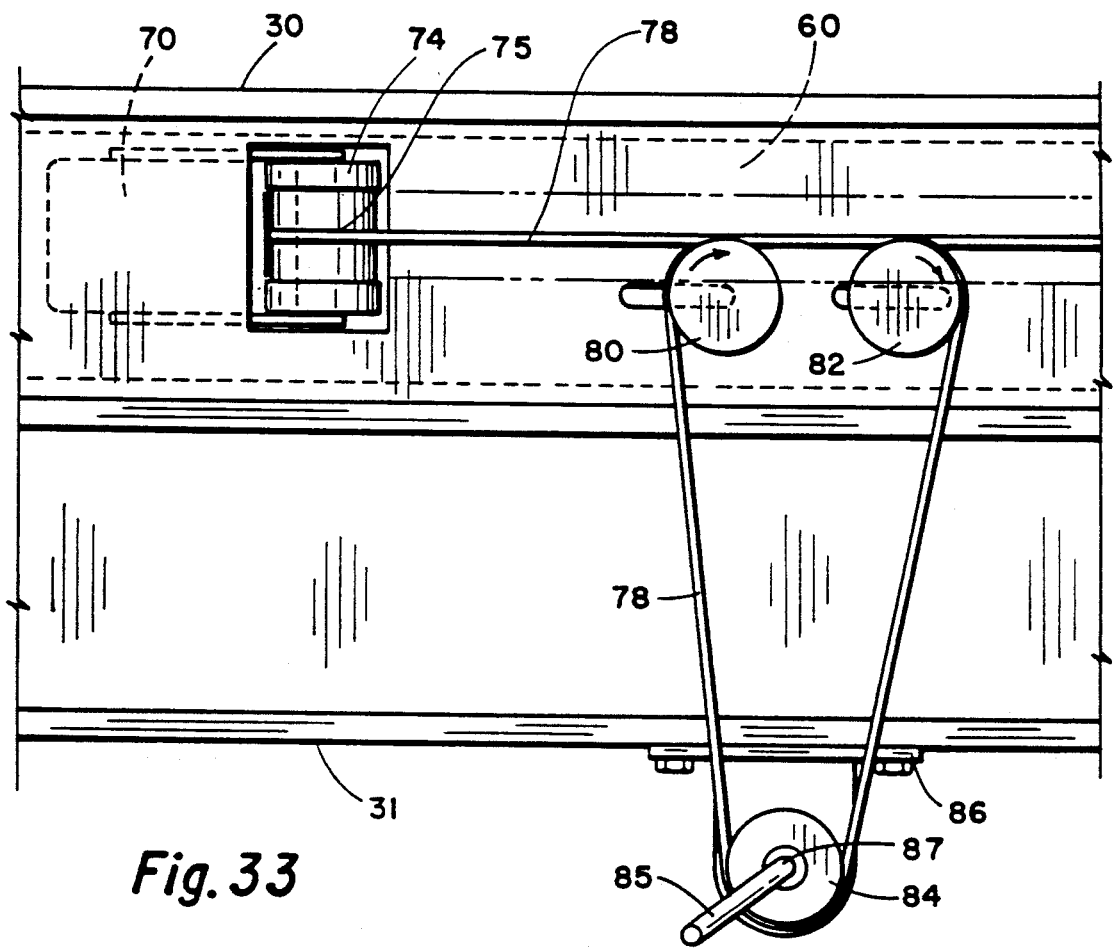
FIG. 33 is a partial side view of one form of mechanism used to move the movable longitudinal measuring tape.

FIGS. 33 and 34 give further description to the movable tape process. All of the tapes are connected together and are thus movable in synchronism. Sheave or spools 74 include a recessed groove to receive endless belt 78 which traverses around sheaves 82, 84, thence 80. A crank handle 85 is used to rotate a common shaft 87 and pulley mechanism and hence the interconnected measuring tapes 60-66 in unison.

OPERATION

Figures 16, 17:
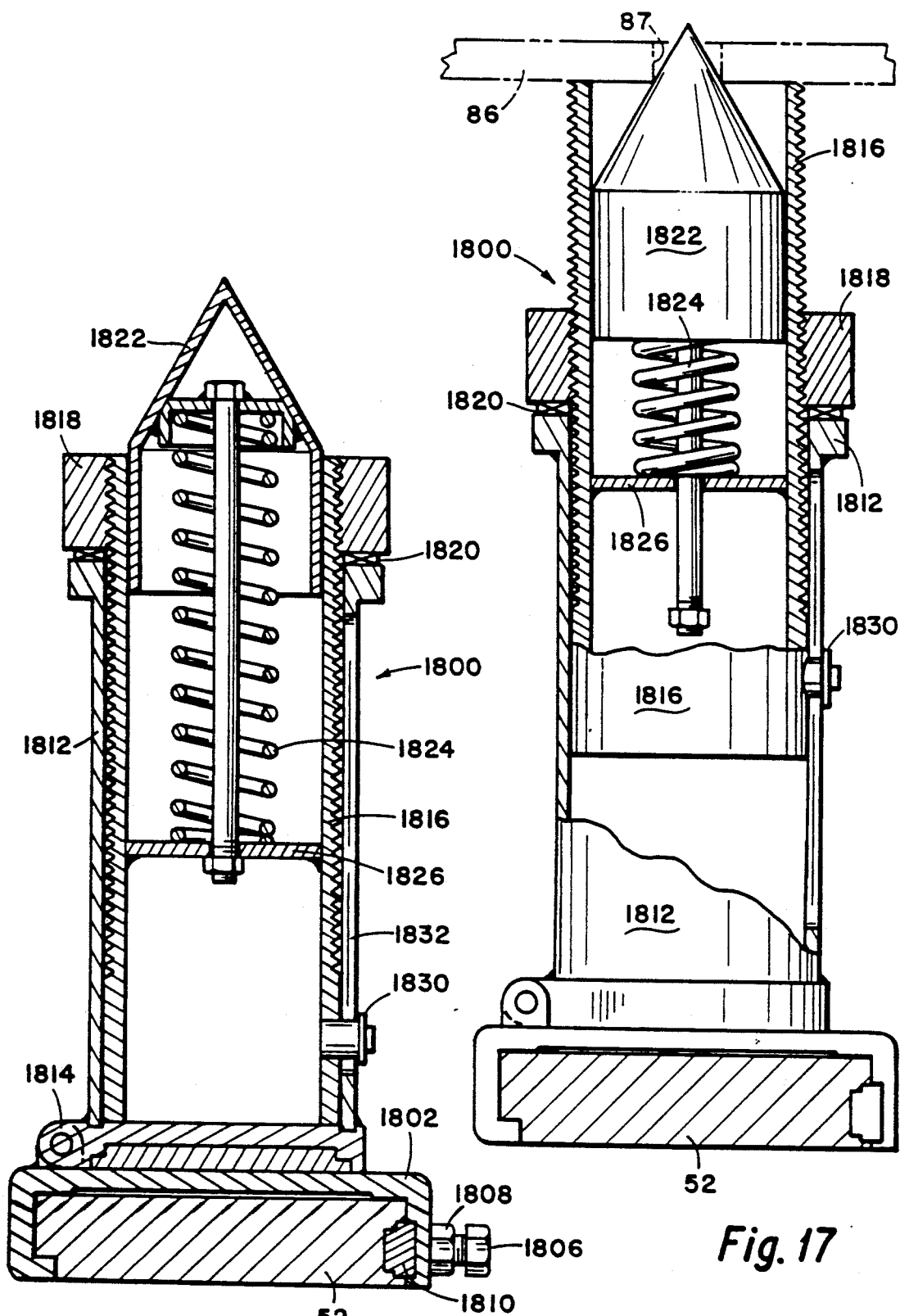
FIG. 16 is a sectional view of the vehicle datum level reference pointer.
FIG. 17 is a side elevational view of the vehicle datum level reference pointer, partly in section in position relative to a vehicle frame reference point.

Assuming a damaged vehicle whose undamaged frame and body specifications are those coincident with FIGS. 4 and 5, the vehicle is driven, pushed, or pulled onto the platform such as shown in FIG. 1. In most instances the platform will be used in conjunction with a body and frame alignment machine such as that shown in FIGS. 2 and 3 in which case the alignment machine is then raised above the floor, utilizing the lift mechanism 88. Suitable removable grids are provided for openings in the treadway 30 of the platform to keep the wheels from dropping into the platform mechanism. Once in position, the pinchweld clamps or frame clamps 50 are adjusted and positioned relative to the preferably undamaged portions of the frame or unibody. The clamps, as shown, are supported by the crossbars 44 and 46 which are attached to or rest upon the top 1202 of the lift jacket system generally designated by the numeral 1200. Once the pinch weld clamps are secured to the vehicle, hydraulic pressure is applied via conduits 1209 (FIGS. 6 and 7) to the hydraulic piston 1208 to raise the vehicle such that the wheels are above the platform 30 as shown in FIGS. 2 and 3. Using the pull tower chain and hook system 82 and 83 or any winch or suitable pulling device, the jacks with the supported vehicle are then pulled forward by the attached cable 1220 into the centering guides 1230 and 1232 (see FIG. 8). As the vehicle is pulled forward, it then becomes centered on the platform system, that is, a vertical plane through the center line of the vehicle will pass through the centerline of the platform. Once this occurs, the platform system, and in particular the top of the platform 30, becomes the datum plane for all measurements. The vehicle is next leveled on the platform system by anchoring the crossbars 44 and 46 to the anchoring mechanism generally designated by the numeral 1400. Once connected to the anchor, the anchors are adjusted vertically to level the vehicle and position it such that the distance from the top of the platform 30 to a given bolt, hole, or other point of reference on the vehicle frame or body, which is undamaged, will now provide distances from which all dimensions are measured. The vehicle is then leveled utilizing the leveling stands 1800 such as shown in FIGS. 13, 16, and 17, thus setting the height to be level and correspond With the dimensions on the chart of FIG. 4 for that particular vehicle.

From a reference point on the vehicle, as taken from the chart, a zero point is established, as for example at point "J" of FIG. 4, by turning the adjustment knob 85 of FIG. 33 to move all four of the measuring scales 60, 62, 64, and 66 in unison.

The zero point then establishes the line which is transverse to the centerline from which all measurements relative to the longitudinal are taken. The next step is to place the crossbar assemblies such as 54 at a distance from the zero axis to an additional point of the vehicle frame that is in need of repair. For example, referring to FIGS. 4 and 5, at point "D", the reference point on the frame should be 11 1/16 inch (281 mm) above the datum plane 30 and should be 52 and 11 1.16 inches from our established transverse zero line. Thus, the crossbar 54 would then be moved longitudinally along the top of the platform 30 to a point where the viewfinder 2008 and pointer 2010 reads 52 and 11 1/16 inches (1,339 mm). A measuring pointer such as that shown in FIGS. 20-29 is then attached to the upright support 2026 and then moved along the crossbar to the transverse position the appropriate distance from the centerline, in this instance 20 ¼ inches (514 mm). The measuring pointer is then positioned or makes contact with the reference "D" of the frame and will immediately give an indication to the operator of the misalignment by reference to the bubble levels 2052 and 2054 and also by reference to the measurement readings on measuring tapes 2046 and 2048 relative to the top of the body 2040 as a reference line. Alternately, with appropriate motion detectors or sensors, as shown in FIG. 21, this information could be relayed to the computer/comparator 24 for an immediate graphic display of the misalignment. One type of sensor is a sealed glass bubble level vial partially filled with an electrically conducting fluid electrically connected by three platinum electrodes two of which, R1 and R2, are spaced apart on the bubble side with the third electrode centrally located at the bottom of the vial. When in a level position, the electrical resistances of R1 and R2 are equal, when tilted, R1>R2 or vice versa, depending on the direction of tilt. The electrical wire hook-up can either be potentiometer wired or using a Wheatstone bridge. Resistance readings can be obtained and converted to degree of tilt from level.

Once this information has been received by the operator/mechanic, he then proceeds to straighten the frame in a manner well known and as described in the aforesaid Pat. Nos. 3,360,066 and Reissue 31,636. The operator, of course, constantly monitors the location of the measuring pointer or pointers 2000 to ensure that the ultimate dimensions from the datum line 30 and from the centerline of the vehicle are achieved. Once all the recommended reference points on the vehicle correspond to those from the specification and dimension chart, the alignment process and repair is complete. At this point all of the measuring pointers are either removed from their holders or caused to lay flat, the leveling stand assemblies are removed, the anchor 1400 removed, and the pinch weld clamps 50 loosened. The lift system is lowered to a point where the vehicle wheels now rest on the treadway. The lift assembly is then lowered to be recessed within the platform, and the vehicle is ready to be removed.

In utilizing the computer with the measuring system herein, the manufacturer's specifications and data such as shown in FIGS. 4 and 5 would have been previously input as a part of the data base, including the manufacturer, the model, year, and the specifications such as shown in FIGS. 4 and 5. Through the information received by the sensors, as shown in FIGS. 1 and 21, information concerning the particular reference point, e.g., position "D", is transmitted to the computer and shown either individually or as a comparative overlay with the specified dimensions. This allows the operator to calculate the misalignment and, in addition, provides the customer with a printout or visual indication of misalignment.

What is claimed is:

1. Apparatus for straightening and/or aligning a misaligned vehicle body and/or frame back to its manufacturer's specifications, said vehicle having a plurality of alignment datum check points, comprising an alignment machine having a longitudinal centerline axis and having a frame which includes a platform with an upper datum surface for said vehicle to be positioned upon and having at least one force means for correcting said misalignment;

a lift means supported by said machine, means to raise said lift means above said upper datum surface, vehicle connection means separately supported on said lift means;

means to move said lift means longitudinally along said platform to a position wherein said lift means and said attached vehicle is coincident with and parallel to said longitudinal axis;

a plurality of vehicle support crossbars transversely positionable on said upper datum surface, a plurality of vertically adjustable vehicle supports transversely positionable on said cross-bars;

anchor means to attach said vehicle connection means to said platform, said anchor means having a jack means to level said vehicle relative to said upper datum surface; and a plurality of measuring crossbars transversely positionable on said datum surface and a plurality of vehicle frame reference pointers, each of said pointers being vertically movable and pivotally connected to a slide bar that is transversely positionable on said crossbars.

2. Apparatus of claim 1 including at least one longitudinally movable measuring tape in said frame for setting a transverse zero axis datum line relative to one or more aligned vehicle datum check points.

3. Apparatus of claim 1 wherein said cross-bars include transverse measuring indicia.

4. Apparatus of claim 1 wherein said pivotal connection of said reference pointer to said slide bar permits relative movement of said reference pointer between a horizontal to a vertical position.

5. Apparatus of claim 4 wherein said pivotal connection is a ball and socket joint.

6. Apparatus of claim 4 wherein said pivotal connection is a universal joint.

7. Apparatus of claim 4 wherein said pivotal connection permits longitudinal and transverse movement.

8. Apparatus of claim 4 wherein said reference pointer includes
   a body
   a pointer piston
   a spring to bias said pointer piston normally upward,
   a measuring tape on said body a first movable indicator to indicate a specified height equal to said manufacturer's specification for a given alignment datum check point on said vehicle frame from said upper datum surface, and a second indicator connected to said pointer piston to provide an actual height from said upper datum surface to said vehicle frame at said given datum point.

9. Apparatus of claim 4 wherein said reference pointer includes horizontal and vertical level indicia means.

10. Apparatus of claim 9 wherein said indicia includes bubble level means.

11. Apparatus of claim 1 wherein said lift means, in a retracted position, is substantially flush with said upper datum surface.

12. Apparatus for straightening and/or aligning misaligned portions of a vehicle body and/or vehicle frame comprising:

a measuring platform with an upper plane surface that becomes a fixed datum for measuring and restoring said misaligned portions of said vehicle back to its manufacturer's specifications, and movable jack means incorporated within said platform to lift and thereafter center said vehicle above said upper plane surface and anchor means to retain said vehicle once lifted and centered, to said measuring platform and wherein said measuring platform is attachable to an existing frame alignment platform of the type having at least one force means for correcting said misaligned portion.

13. Apparatus of claim 12 wherein said force means comprises at least one pull tower means movably connected to said frame alignment platform relative to said misaligned portions of said vehicle; means associated with said tower to cause a pull or push first force; means to connect a tension member between said first force means and said vehicle; and means to apply a second force between a portion of said vehicle and aid measuring platform.

14. Apparatus of claim 13 wherein said first force means comprises a vertically elongatable pull tower.

15. Apparatus of claim 14 wherein said pull tower is hydraulically actuated.

16. Apparatus of claim 13 wherein said tension member is a chain or cable.

17. A reference pointer for indicating and measuring vertical distances from a fixed datum surface to a reference point on a vehicle, comprising a vertical body;

a pointer piston reciprocable within said body, said piston having means at its upper end to connect said vehicle;

a spring means to bias said pointer piston normally vertically upward;

a measuring indicia on said body;

a first movable indicator to indicate a specified height equal to a vertical distance from said fixed datum surface as set by a vehicle specification chart; and a second indicator connected to said pointer piston to provide an actual height from said fixed datum surface to said reference point on said vehicle.

18. A method for straightening and/or aligning a misaligned vehicle body and/or frame wherein said vehicle includes one or more defined datum alignment points from a given longitudinal centerline of said vehicle, comprising the steps of:

positioning said vehicle on the upper surface of a vehicle body and frame alignment machine of the type having at least one force means that can be pivotally positioned about said vehicle, and further having on the upper surface of said machine a defined longitudinal centerline, a plurality of vertically and horizontally movable leveling stands, a plurality of vertically and horizontally movable measuring pointers, said stands and said pointers extendable upwardly vertical from said machine and a movable vehicle lift means, said machine having measuring indicia thereon relative to said measuring pointers.

attaching the underneath side of said vehicle to said vehicle lift means, raising said vehicle above said upper surface of said machine with said vertical lift means, moving said vehicle lift means, with said attached vehicle thereon, to a position where said centerline of said vehicle is over and parallel to said longitudinal centerline of said machine, adjusting said leveling stands to a given height above said upper surface of said machine, positioning said leveling stands to defined vehicle support points, lowering said vehicle so that it will rest upon said leveling stands, and be rigidly connected to said machine, positioning said measuring pointers and inter-connecting same to said vehicle to at least one of said alignment datum points, positioning said force means to a desired position relative to the area of said vehicle to be aligned, and actuating said force means.

19. Apparatus to raise and level a vehicle above and substantially parallel to a given horizontal datum plane on a platform system, said system defining a longitudinal centerline comprising:

a pair of parallel lift jacks arisable from a retracted position on said platform, to permit said vehicle to pass over said lift jacks to said raised position;

vehicle clamp means on each said lift jack to rigidly clamp with said vehicle;

guidance means on said platform system to simultaneously move said lift jacks to a position substantially parallel with said centerline;

interconnect means to rigidly support said vehicle clamp means with said platform system.

20. Apparatus of claim 19 wherein said interconnect means comprises a plurality of anchor/leveling stands having means at one end to rigidly connect with said platform system and a vertically movable means at the other end to a rigidly connect with said vehicle clamp means, said interconnect means having indicator means to determine the height of a leveled vehicle frame or body from said horizontal datum plane.

21. Apparatus of claim 20 wherein said indicator means includes a measuring tape affixed to said vertically movable means and a pointer means affixed to said stand, said tape to provide an indication of the distance from said datum plane to said vehicle at a reference point at said vehicle clamp means.

22. Apparatus of claim 19 wherein said vehicle clamp means includes a plurality of crossbar members positioned transversely upon said lift jack, a plurality of vehicle clamp base means slidably positionable on and lockable to said crossbar, indicia means on said crossbar to indicate a given transverse position of a frame or body clamp relative to a longitudinal centerline of said platform system, said clamp means attached to a flanged vehicle clamp connector, a partial circular opening on said base means to removably receive said flange of said vehicle clamp connector; and means to releasably lock said flange to said base means.

23. Apparatus of claim 22 including a screw thread tension adjustment means interconnecting said base means and said crossbar.

24. Apparatus for positioning on a platform system having a datum plane to measure the distance from said datum plane to a datum reference point on a vehicle, said apparatus comprising in combination:

a crossbar transversely positionable upon said platform system;

a base member slidably positionable and lockable to said crossbar;

indicia means on said crossbar to indicate a given transverse position of said base member relative to a longitudinal centerline to said platform system;

a cylindrical body pivotally hinged to said base member;

a threaded sleeve axially movable within said cylindrical body, a nut rotatably situated on top of said cylindrical body, the rotation of which will raise and lower said threaded sleeve;

a pointer means slidably received within said threaded sleeve, spring means within said threaded sleeve to normally bias said pointer means upwardly means on said threaded sleeve and cooperative with said cylindrical body to indicate the height from said datum plane to a top of said nut.

25. Apparatus of claim 24 wherein said means to indicate the height from said datum plane to said top of said nut also includes a measuring tape to indicate the actual height according to a vehicle specification chart.

26. Apparatus of claim 24 wherein said pivotal hinge of said cylindrical body to said base member is a ball and socket joint.

27. Apparatus of claim 24 wherein said pivotal hinge is a universal joint.

28. A platform system for measuring aligned and misaligned reference points on a vehicle body or frame, said platform system having a horizontal datum plane from which vertical and horizontal measurements are taken, means on said platform system to receive and raise said vehicle substantially parallel above the platform and datum plane and move said vehicle to a place where a plane passing through the longitudinal centerline of said vehicle aligned reference points intersects a longitudinal centerline of said datum plane.

29. A method with the aid of a digital computer for determining aligned and misaligned reference points on a vehicle frame or body with reference to a platform system having a datum plane which plane includes a longitudinal centerline coincident with the longitudinal centerline of aligned reference points on said vehicle frame or body, comprising the steps of providing said computer with a data base of the specification of an aligned vehicle as to height distances from said datum plane and transverse distances of a given reference point of said vehicle from said longitudinal centerline;

positioning at least one measuring pointer means at a specified transverse distance from said centerline and at a specified height above said datum plane adjacent to and in contact with a given reference point of said vehicle frame or body;

providing sensors to said measuring pointer to provide information as to an orientation of an X, Y and Z axis of said measuring pointer, wherein:

X is a horizontal transverse axis,

Y is a horizontal longitudinal axis, and

Z is a vertical axis, providing said computer with said X, Y and Z data;

comparing said X, Y, and Z data with said X, Y and Z specifications of an aligned vehicle; and displaying said information.

30. The method of claim 29 including a step of causing a print of said displayed information.

31. Apparatus for straightening and/or aligning misaligned portions of a vehicle body and/or vehicle frame comprising:

a measuring platform with an upper plane surface that becomes a fixed datum for measuring and restoring said misaligned portions of said vehicle back to its manufacturer's specifications relative to a defined longitudinal centerline, and jack means incorporated within said platform, means to attach said vehicle to said jack means and to lift said vehicle above said upper plane surface, means to move said jack means, after said vehicle has been attached and lifted, whereby a longitudinal centerline of said vehicle is in the same vertical plane of said defined longitudinal centerline, and anchor means to retain said vehicle once lifted and centered, to said measuring platform.

32. Apparatus of claim 31 wherein said measuring platform includes a defined longitudinal centerline; a plurality of vertically and horizontally movable leveling stands; a plurality of measuring pointers, said measuring pointers being:

(1) vertically adjustable relative to said fixed datum surface, (2) horizontally adjustable relative to said longitudinal centerline; and (3) pivotally connected so as to move between a vertical and horizontal position.

33. Apparatus of claim 31 wherein said measuring platform is attachable to an existing frame alignment platform of the type having at least one force means for correcting said misaligned portions.

34. Apparatus of claim 33 wherein said force means comprises at least one pull tower means movably connected to said frame alignment platform relative to said misalignment portions of said vehicle; means associated with said tower to cause a pull or push first force; means to connect a tension member between said first force means and said vehicle; and means to apply a second force between a portion of said vehicle and said measuring platform.

35. Apparatus of claim 34 wherein said first force means comprises a vertically elongatable pull tower.

36. Apparatus of claim 35 wherein said pull tower is hydraulically actuated.

37. Apparatus of claim 31 wherein said tension member is a chain or cable.

38. Apparatus of claim 31 wherein said measuring platform includes a plurality of vertically and horizontally movable leveling stands; a plurality of measuring pointers, said measuring pointers being:
(1) vertically adjustable relative to said fixed datum surface;
(2) horizontally adjustable relative to said longitudinal centerline; and
(3) pivotally connected so as to move between a vertical and horizontal position.

39. Apparatus of claim 31 including an upper body and frame measuring system comprising:
a pair of spaced vertical posts connected to said platform and movable longitudinally along said platform;
a transverse crossbar interconnecting and between said vertical posts, said crossbar having counterbalance means for vertical movement to a desired position;
at least one movable reference pointer attached to said crossbar for measuring vertical distances relative to said fixed datum.

40. Apparatus of claim 20 wherein said vehicle clamp means includes
at least one crossbar member positioned transversely upon said lift jack,
means to slidably position said vehicle clamp means upon and lockable to said crossbar, indicia means on said crossbar to indicate a given position relative to said longitudinal centerline of said platform system, and
screw thread means interconnecting said vehicle clamp means and said crossbar for moving said vehicle to a position whereby a longitudinal centerline of said vehicle is in the same vertical plane of said longitudinal centerline of said platform system.

41. A reference pointer for indicating and measuring vertical distances from a fixed datum surface to a reference point on a vehicle, comprising
a vertical body;
a pointer piston reciprocable within said body, said piston having means at its upper end to connect to said body;
a spring means to bias said pointer piston normally vertically upward;
a measuring indicia means on said body to indicate a specified height equal to a vertical distance from said fixed datum surface as set by a vehicle specification chart and to provide an actual height distance from said fixed datum surface to said reference point on said vehicle.

42. The reference pointer of claim 41 wherein said measuring means includes electrical sensors for providing information to a computer.

43. A measuring platform for use in straightening and/or aligning misaligned portions of a vehicle body and/or vehicle frame comprising:
a measuring crossbar transversely positionable on a measuring platform having a fixed datum surface;
a plurality of vehicle frame reference pointers slidably positioned on said crossbar;
indicia means on said crossbar to indicate a given position transverse to a hypothetical longitudinal centerline of said platform system;
said reference pointer including a body portion;
a pointer piston;
a spring to bias said pointer piston normally upward;
measuring means on said body portion indicating a specific height equal to a vehicle frame or body specification at a given alignment datum checkpoint on said vehicle frame or body from said fixed datum surface, and to provide an actual height measurement from said fixed datum surface to said vehicle frame or body at said given alignment datum checkpoint.

44. Apparatus of claim 43 wherein said reference pointer includes horizontal and vertical level indicia means.

45. Apparatus of claim 43 wherein said indicia includes bubble level means.

46. Apparatus of claim 43 wherein said measuring means includes electrical sensing means for sensing information of said specific height and said actual height measurements and means to receive and display said information.

47. Apparatus of claim 44 including electrical sensing means for sensing said horizontal and vertical levels and means to receive and display said levels.

48. An upper body and frame measuring system comprising:
a pair of spaced vertical posts connected to a platform and movable longitudinally along said platform;
a transverse crossbar interconnecting and between said vertical posts, said crossbar having counterbalance means for vertical movement to a desired position;
at least one movable reference pointer attached to said crossbar for measuring vertical distances relative to said fixed datum, said reference pointer having means to permit relative movement between a horizontal and vertical position.

49. The system of claim 48 including measuring indicia on said crossbar for positioning said reference pointer at a given position therealong.

50. A method with the aid of a digital computer for determining aligned and misaligned reference points on a vehicle frame or body comprising the steps of:
positioning said vehicle relative to platform system for correcting said mialigned reference point said platform system providing a horizontal datum plane which plane includes a longitudinal centerline coincident with a longitudinal centerline of said frame or body;
providing said computer with a data base of specifications corresponding to an aligned vehicle as to the position of given reference points on said vehicle frame or body relative to said datum plane;
positioning a measuring indicator means to and in contact with at least one of said reference points of said vehicle frame or body;
sensing the locus of said measuring indicator means relative to said datum plane or said longitudinal centerline;
providing said computer with data received from said sensing the locus of said measuring indicator means;
comparing said data with said specifications of said aligned vehicle; and
displaying said comparative information.

51. The method of claim 50 including a step of causing a print of said displayed information.

52. The method of claim 50 plus the steps of correcting any misaligned reference points while continuing to displays aid comparative information until said misaligned reference point of said vehicle frame or body matches that of said specifications of said aligned vehicle.

53. A method with the aid of a digital computer for determining aligned and misaligned reference points on a vehicle frame or body, comprising the steps of:
- providing a horizontal datum plane relative to said vehicle frame or body;
- providing said computer with a data base of specifications corresponding to an aligned vehicle as to the position of given reference points on said vehicle frame or body relative to said datum plane;
- positioning a measuring indicator means to at least one given reference point of said vehicle frame or body;
- providing means relative to said measuring indicator means to signal information as to the locus of said measuring indicator means relative to said datum plane;
- providing said computer with said information;
- comparing said information with said specifications of an aligned vehicle; and
- displaying said comparative information.

54. The method of claim 53 including a step of causing a print of said displayed information.

55. The method of claim 53 wherein said information includes orientation of an X, Y and Z axis of said indicator means, wherein:
- X is a horizontal longitudinal axis,
- Y is a horizontal transverse to said longitudinal axis; and
- Z is a vertical axis.

56. Apparatus for providing comparative data of aligned and misaligned reference points on a vehicle frame or body comprising:
- a computer which ha been provided with a data base of specifications of locus dimensions of given reference points of an aligned vehicle relative to a given datum line or plane;
- means to support said vehicle;
- means relative to aid means to support to establish a datum line or plane relative to said vehicle;
- a measuring indicator means connected to at least one of said reference points of said vehicle frame or body;
- means to signal information as to the locus of said measuring indicator means relative to said established datum line or plane and transmit said information to said computer for comparative analysis of misalignment with said specifications of said aligned vehicle.

57. Apparatus of claim 56 wherein said information includes orientation of an X, Y and Z axis of aid measuring indicator means, wherein:
- X is a horizontal axis,
- Y is a horizontal axis transverse to said X axis, and
- Z is a vertical axis.

58. Apparatus of claim 56 including means to display said comparative analysis.

59. Apparatus of claim 58 wherein said means to display includes means to print-out said comparative analysis.

60. Apparatus of claim 56 wherein said datum line or plane is horizontal relative to said vehicle or body.

61. Apparatus of claim 56 wherein said datum line or plane is vertical relative to said vehicle or body.

* * * * *